(12) United States Patent
Alabbasi et al.

(10) Patent No.: US 12,526,836 B2
(45) Date of Patent: Jan. 13, 2026

(54) HANDLING OVERLAPPING OF MULTIPLE PHYSICAL UPLINK SHARED CHANNELS (PUSCHs)

(71) Applicant: Telefonaktiebolaget LM Ericsson (publ), Stockholm (SE)

(72) Inventors: Abdulrahman Alabbasi, Kista (SE); Torsten Dudda, Wassenberg (DE); Zhenhua Zou, Solna (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 636 days.

(21) Appl. No.: 17/782,198

(22) PCT Filed: Feb. 1, 2021

(86) PCT No.: PCT/SE2021/050075
§ 371 (c)(1),
(2) Date: Jun. 3, 2022

(87) PCT Pub. No.: WO2021/162604
PCT Pub. Date: Aug. 19, 2021

(65) Prior Publication Data
US 2023/0021043 A1    Jan. 19, 2023

Related U.S. Application Data

(60) Provisional application No. 62/976,179, filed on Feb. 13, 2020.

(51) Int. Cl.
*H04W 72/566* (2023.01)
*H04W 72/1268* (2023.01)
*H04W 72/23* (2023.01)

(52) U.S. Cl.
CPC ..... *H04W 72/569* (2023.01); *H04W 72/1268* (2013.01); *H04W 72/23* (2023.01)

(58) Field of Classification Search
None
See application file for complete search history.

(56) References Cited

U.S. PATENT DOCUMENTS 12,177,849 B2 * 12/2024 Zhang .................. H04W 72/21
2016/0337987 A1 * 11/2016 Yi ....................... H04W 52/325
(Continued)

OTHER PUBLICATIONS

Author Unknown, "Technical Specification Group Radio Access Network; NR; NR and NG-RAN Overall Description; Stage 2 (Release 15)," Technical Specification 38.300, Version 15.2.0, Jun. 2018, 3GPP Organizational Partners, 87 pages.
Ericsson, "R2-2000797: Remaining details of intra-UE prioritization," 3GPP TSG-RAN WG2 #109e, Feb. 24-Mar. 6, 2020, Electronic Meeting, 8 pages.
(Continued)

*Primary Examiner* — Clemence S Han
(74) *Attorney, Agent, or Firm* — Withrow & Terranova, PLLC

(57) ABSTRACT

Handling overlapping of multiple physical uplink shared channels (a combination of one or more PUSCHs and PUCCHs) is disclosed herein. In one embodiment, a method performed by a wireless device for handling an overlapping group of transmissions with differing transmission priorities comprises determining that at least one grant-specific uplink (UL) resource of multiple grant-specific UL resources overlaps with two other grant-specific UL resources of the plurality of grant-specific UL resources. The method further comprises dividing overlapping grant-specific UL resources of the multiple grant-specific UL resources into a plurality of groups such that each group of the plurality of groups only contains grant-specific UL resources that are non-overlapping. The method also comprises identifying, from the plurality of groups, a group that contains a grant-specific UL resource having a highest transmission priority. The method (Continued)

additionally comprises performing a transmission associated with the grant-specific UL resources within the identified group.

2 Claims, 19 Drawing Sheets

(56) References Cited

U.S. PATENT DOCUMENTS

| | | | | |
|---|---|---|---|---|
| 2020/0205090 A1* | 6/2020 | Loehr | | H04W 52/40 |
| 2020/0314883 A1* | 10/2020 | Chin | | H04L 5/0094 |
| 2021/0050901 A1* | 2/2021 | Chin | | H04W 72/56 |
| 2021/0084674 A1* | 3/2021 | Wei | | H04L 1/1864 |
| 2021/0219322 A1* | 7/2021 | Chin | | H04W 72/23 |
| 2021/0400701 A1* | 12/2021 | Lu | | H04W 72/21 |
| 2023/0336313 A1* | 10/2023 | Loehr | | H04L 1/1874 |

OTHER PUBLICATIONS

Mediatek Inc., "R1-1900214: Intra-UE multiplexing and prioritization between mixed traffic priorities," 3GPP TSG RAN WG1 Ad-Hoc Meeting 1901, Jan. 21-25, 2019, Taipei, Taiwan, 5 pages.

Nokia, et al., "RP-190728: New WID: Support of NR Industrial Internet of Thing (IoT)," 3GPP TSG RAN Meeting #83, Mar. 18-21, 2019, Shenzhen, China, 6 pages.

Qualcomm Incorporated, "R2-1910736: Intra-UE prioritization framework and RAN1 impacts," 3GPP TSG-RAN WG2 Meeting #107, Aug. 26-30, 2019, Prague, Czech Republic, 14 pages.

Samsung, "R2-1916352: MAC Running CR for NR IIOT," Change Request, 3GPP TSG-RAN2 Meeting #108, Nov. 18-22, 2019, Reno, Nevada, 81 pages.

International Search Report and Written Opinion for International Patent Application No. PCT/SE2021/050075, mailed May 10, 2021, 14 pages.

* cited by examiner

HANDLING OVERLAPPING OF MULTIPLE PHYSICAL UPLINK SHARED CHANNELS (PUSCHs)

RELATED APPLICATIONS

This application is a 35 U.S.C. § 371 national phase filing of International Application No. PCT/SE2021/050075, filed Feb. 1, 2021, which claims the benefit of provisional patent application Ser. No. 62/976,179, filed Feb. 13, 2020, the disclosures of which are hereby incorporated herein by reference in its entirety their entireties.

TECHNICAL FIELD

The present disclosure relates to management of physical uplink shared channels (PUSCHs) in cellular communications networks.

BACKGROUND

The subject matter of the present disclosure is described within the context of Third Generation Partnership Project (3GPP) New Radio (NR) radio technology, described in 3GPP Technical Specification (TS) 38.300 V 15.2.0 (2018 June). It is understood, however, that the problems and solutions described herein are equally applicable to wireless access networks and user-equipments (UEs) implementing other access technologies and standards. NR is used as an example technology where the subject matter of the present disclosure is suitable, and using NR in the description therefore is particularly useful for understanding the problem and solutions solving the problem. In particular, the subject matter of the present disclosure is applicable also to 3GPP Long Term Evolution (LTE), or 3GPP LTE and NR integration, also denoted as non-standalone NR.

In an Industrial Internet of Things (IoT) (IIoT) Release 16 (Rel. 16) Work Item Description (WID)—"RP-190728, WID: Support of NR Industrial Internet of Things (IoT)" (hereinafter referred to as "RP-190728"), NR technology enhancements are studied with the target of providing more deterministic low-latency delivery of data. This traffic is also referred to as Time Sensitive Networking (TSN) traffic with typically periodic packet occurrences per cycle time.

Uplink (UL) traffic can be scheduled with dynamic UL grants or configured UL grants. In case of dynamic grants, a Fifth Generation (5G) Base Station (gNB) provides an UL grant to the UE for each UL transmission. Configured grants are pre-allocated, i.e., provided once to the UE, and thereafter the configured UL grant is valid for usage for UL transmissions according to a configured periodicity. The UE does not need to transmit padding on those UL resources if no UL data is available for transmission, i.e., may skip an UL transmission on such grants.

A typical NR-IIoT device would handle communication for multiple service types, e.g., multiple periodic Ultra-Reliable Low Latency Communications (URLLC)-type robot control messages (also referred to as TSN-like traffic), URLLC-type occasional alarm signals (for which periodic resources would need to be configured or would rely on the UE to send scheduling request for each occasional alarm message), occasional sensor data transmission (which can be time-critical or non-time-critical), other Mobile Broad Band (MBB) or enhanced MBB (eMBB) best-effort type traffic such as occasional video transmissions or software updates. It would lead to a traffic mix to be multiplexed by the UE for UL transmissions: for example, on Media Access Control (MAC), multiple logical channels with different priorities would need to be configured. In such a traffic mix scenario, it is crucial to treat URLLC-type of traffic with high priority.

In RP-190728, intra-UE multiplexing/prioritization has been discussed and specified. For UL, the MAC layer performs Logical Channel (LCH) and grants prioritization procedures based on a defined priority. (A detailed description of such prioritization procedures can be found in MAC Change Request (CR) R2-1916352 (hereinafter referred to as "R2-1916352"). R2-1916352 states, in pertinent part, the following, as shown in Table 1:

TABLE 1

For the MAC entity configured with lch-basedPrioritization, priority of an uplink grant is determined by the highest priority among priorities of the logical channels with data available that are multiplexed or can be multiplexed in the MAC Protocol Data Unit (PDU), according to the mapping restrictions as described in clause 5.4.3.1.2.
Editor's Note: Priority determination considering MAC Control Element (CE) and configuredGrantTimer is For Future Study (FFS).
When the MAC entity is configured with lch-basedPrioritization for each uplink grant:
    1>    if this uplink grant is addressed to C-RNTI or CS-RNTI:
            2>    if there is no overlapping PUSCH duration of a configured uplink grant whose priority is higher than the priority of the uplink grant; and
            2>    if there is no overlapping PUCCH resource with an SR transmission where the priority of the logical channel that triggered the SR is higher than the priority of the uplink grant:
                    3>    this uplink grant is a prioritized uplink grant;
                    3>    the other overlapping uplink grant(s), if any, is a deprioritized uplink grant.
Editor's Note: It is FFS whether an uplink grant addressed to CS-RNTI with NDI=1 (i.e., retransmission of a configured grant) is a configured grant or not. In this version of running CR, it is assumed that an uplink grant addressed to CS-RNTI with NDI=1 is considered as a dynamic grant.
Editor's Note: It is FFS whether an uplink grant addressed to CS-RNTI with NDI=0 (i.e., (re-)activation of type 2 CG) is a configured grant or not. In this version of running CR, it is not clearly captured.
    1>    else if this uplink grant is a configured uplink grant:
            2>    if there is no overlapping PUSCH duration of another configured uplink grant whose priority is higher than the priority of the uplink grant; and
            2>    if there is no overlapping PUSCH duration of an uplink grant addressed to C-RNTI or CS-RNTI whose priority is higher than or TABLE 1-continued equal to the priority of the uplink grant; and
2> if there is no overlapping PUCCH resource with an SR
transmission where the priority of the logical channel that
triggered the SR is higher than the priority of the uplink grant:
3> this uplink grant is a prioritized uplink grant;
3> the other overlapping uplink grant(s), if any, is a
deprioritized uplink grant.
NOTE: If there is overlapping PUSCH duration of at least two configured uplink grants
whose priorities are equal, the prioritized uplink grant is determined by UE
implementation.
Editor's Note: It is FFS how UE handles the case that at least two uplink grants with
different MAC PDUs overlap with an SR transmission.

SUMMARY

Methods and systems are disclosed herein for handling an overlapping group of transmissions with differing transmission priorities. Embodiments of a method performed by a wireless device for handling an overlapping group of transmissions with differing transmission priorities are disclosed herein. In some embodiments, the method comprises determining that at least one grant-specific uplink (UL) resource of a plurality of grant-specific UL resources overlaps with two other grant-specific UL resources of the plurality of grant-specific UL resources. The method further comprises dividing overlapping grant-specific UL resources of the plurality of grant-specific UL resources into a plurality of groups such that each group of the plurality of groups only contains one or more grant-specific UL resources that are non-overlapping. The method also comprises identifying, from the plurality of groups, a group that contains a grant-specific UL resource having a highest transmission priority. The method additionally comprises performing a transmission associated with the one or more grant-specific UL resources within the identified group.

In some embodiments, the plurality of grant-specific UL resources comprises grant-specific UL resources within a specific duration of time. Some such embodiments may provide that the specific duration of time is defined by a predefined number of orthogonal frequency-division multiplexing (OFDM) symbols or a predefined number of grant-specific UL resources. According to some embodiments, identifying the group that contains the grant-specific UL resource having the highest transmission priority comprises assigning, to each group of the plurality of groups, a priority equal to a highest transmission priority of a grant-specific UL resource within the group, identifying a pair of groups within the plurality of groups, deprioritizing the one or more grant-specific UL resources within a group having a lower priority among the pair of groups, and repeating the identifying and the deprioritizing for all groups within the plurality of groups. Additionally, in such embodiments, performing the transmission associated with the one or more grant-specific UL resources within the identified group comprises performing the transmission associated with non-deprioritized grant-specific UL resources.

In some embodiments, deprioritizing the one or more grant-specific UL resources within the group having the lower priority further comprises removing the grant-specific UL resources within the group having the lower priority from further consideration of priority. Some embodiments may provide that deprioritizing the one or more grant-specific UL resources comprises deprioritizing only grant-specific UL resources within a specific duration of time. According to some such embodiments, the specific duration of time comprises a predefined number of OFDM symbols or a predefined number of grant-specific UL resources.

Embodiments of a wireless device are also disclosed herein. In some embodiments, the wireless device is adapted to determine that at least one grant-specific UL resource of a plurality of grant-specific UL resources overlaps with two other grant-specific UL resources of the plurality of grant-specific UL resources. The wireless device is further adapted to divide overlapping grant-specific UL resources of the plurality of grant-specific UL resources into a plurality of groups such that each group of the plurality of groups only contains one or more grant-specific UL resources that are non-overlapping. The wireless device is also adapted to identify, from the plurality of groups, a group that contains a grant-specific UL resource having a highest transmission priority. The wireless device is additionally adapted to perform a transmission associated with the one or more grant-specific UL resources within the identified group. According to some embodiments, the wireless device is further adapted to perform any of the steps attributed to the wireless device in the above-disclosed methods.

Embodiments of a wireless device are also disclosed herein. In some embodiments, the wireless device comprises one or more transmitters, one or more receivers, and processing circuitry associated with the one or more transmitters and the one or more receivers. The processing circuitry is configured to cause the wireless device to determine that at least one grant-specific UL resource of a plurality of grant-specific UL resources overlaps with two other grant-specific UL resources of the plurality of grant-specific UL resources. The processing circuitry is further configured to cause the wireless device to divide overlapping grant-specific UL resources of the plurality of grant-specific UL resources into a plurality of groups such that each group of the plurality of groups only contains one or more grant-specific UL resources that are non-overlapping. The processing circuitry is also configured to cause the wireless device to identify, from the plurality of groups, a group that contains a grant-specific UL resource having a highest transmission priority. The processing circuitry is additionally configured to cause the wireless device to perform a transmission associated with the one or more grant-specific UL resources within the identified group. According to some embodiments, the processing circuitry is further configured to cause the wireless device to perform any of the steps attributed to the wireless device in the above-disclosed methods.

Embodiments of a method performed by a wireless device for handling an overlapping group of transmissions with differing transmission priorities are also disclosed herein. In some embodiments, the method comprises determining that at least one grant-specific UL resource of a plurality of grant-specific UL resources overlaps with two other grant-specific UL resources of the plurality of grant-specific UL resources. The method further comprises identifying a first pair of overlapping grant-specific UL resources. The method also comprises deprioritizing a grant-specific UL resource having a lower priority within the first pair. The method additionally comprises removing the grant-specific UL resource having the lower priority from further consideration of priority. The method further comprises repeating the identifying and the deprioritizing until there are no more overlapping grant-specific UL resources.

In some embodiments, the plurality of grant-specific UL resources comprises grant-specific UL resources within a specific duration of time. According to some such embodiments, the specific duration of time is defined by a predefined number of OFDM symbols or a predefined number of grant-specific UL resources.

Embodiments of a wireless device are also disclosed herein. In some embodiments, the wireless device is adapted to determine that at least one grant-specific UL resource of a plurality of grant-specific UL resources overlaps with two other grant-specific UL resources of the plurality of grant-specific UL resources. The wireless device is further adapted to identify a first pair of overlapping grant-specific UL resources. The wireless device is also adapted to deprioritize a grant-specific UL resource having a lower priority within the first pair. The wireless device is additionally adapted to remove the grant-specific UL resource having the lower priority from further consideration of priority. The wireless device is further adapted to repeat the identifying and the deprioritizing until there are no more overlapping grant-specific UL resources. In some embodiments, the wireless device is further adapted to perform any of the steps attributed to the wireless device in the above-disclosed methods.

Embodiments of a wireless device are also disclosed herein. In some embodiments, the wireless device comprises one or more transmitters, one or more receivers, and processing circuitry associated with the one or more transmitters and the one or more receivers. The processing circuitry is configured to cause the wireless device to determine that at least one grant-specific UL resource of a plurality of grant-specific UL resources overlaps with two other grant-specific UL resources of the plurality of grant-specific UL resources. The processing circuitry is further configured to cause the wireless device to identify a first pair of overlapping grant-specific UL resources. The processing circuitry is also configured to cause the wireless device to deprioritize a grant-specific UL resource having a lower priority within the first pair. The processing circuitry is additionally configured to cause the wireless device to remove the grant-specific UL resource having the lower priority from further consideration of priority. The processing circuitry is further configured to cause the wireless device to repeat the identifying and the deprioritizing until there are no more overlapping grant-specific UL resources. According to some embodiments, the processing circuitry is further configured to cause the wireless device to perform any of the steps attributed to the wireless device in the above-disclosed methods.

Embodiments of a method performed by a wireless device for handling an overlapping group of transmissions with differing transmission priorities are also disclosed. In some embodiments, the method comprises determining that at least one grant-specific UL resource of a plurality of grant-specific UL resources overlaps with two other grant-specific UL resources of the plurality of grant-specific UL resources. The method further comprises determining that a first grant-specific UL resource of the overlapping grant-specific UL resources comprises a first Scheduling Request (SR). The method also comprises determining that the first grant-specific UL resource overlaps with another grant-specific UL resource having a lower priority than the first grant-specific UL resource. The method additionally comprises, upon determining that the first grant-specific UL resource overlaps with another grant-specific UL resource having a lower priority than the first grant-specific UL resource, deprioritizing all grant-specific UL resources that overlap with the first grant-specific UL resource.

In some embodiments, the method further comprises determining that a second grant-specific UL resource of the overlapping grant-specific UL resources comprises a second SR. The method also comprises determining that the second grant-specific UL resource does not overlap with another grant-specific UL resource having a lower priority than the second grant-specific UL resource. The method additionally comprises, upon determining that the second grant-specific UL resource does not overlap with another grant-specific UL resource having a lower priority than the second grant-specific UL resource, prioritizing overlapping grant-specific UL resources. Prioritizing the overlapping grant-specific UL resources is performed by identifying a first pair of overlapping grant-specific UL resources, deprioritizing a grant-specific UL resource within the first pair having the lower priority, removing the grant-specific UL resource within the first pair having the lower priority from further consideration of priority, and repeating the identifying and the deprioritizing until there are no more overlapping grant-specific UL resources.

Some embodiments may provide that the plurality of grant-specific UL resources comprises grant-specific UL resources within a specific duration of time. In some such embodiments, the specific duration of time is defined by a predefined number of orthogonal frequency-division multiplexing (OFDM) symbols or a predefined number of grant-specific UL resources.

Embodiments of a wireless device are also disclosed herein. In some embodiments, the wireless device is adapted to determine that at least one grant-specific UL resource of a plurality of grant-specific UL resources overlaps with two other grant-specific UL resources of the plurality of grant-specific UL resources. The wireless device is further adapted to determine that a first grant-specific UL resource of the overlapping grant-specific UL resources comprises a first SR. The wireless device is also adapted to determine that the first grant-specific UL resource overlaps with another grant-specific UL resource having a lower priority than the first grant-specific UL resource. The wireless device is additionally adapted to, upon determining that the first grant-specific UL resource overlaps with another grant-specific UL resource having a lower priority than the first grant-specific UL resource, deprioritize all grant-specific UL resources that overlap with the first grant-specific UL resource. According to some embodiments, the wireless device is further adapted to perform any of the steps attributed to the wireless device in the above-disclosed methods.

Embodiments of a wireless device are also disclosed herein. In some embodiments, the wireless device comprises one or more transmitters, one or more receivers, and processing circuitry associated with the one or more transmitters and the one or more receivers. The processing circuitry is configured to cause the wireless device to determine that at least one grant-specific UL resource of a plurality of grant-specific UL resources overlaps with two other grant-specific UL resources of the plurality of grant-specific UL resources. The processing circuitry is further configured to cause the wireless device to determine that a first grant-specific UL resource of the overlapping grant-specific UL resources comprises a first SR. The processing circuitry is also configured to cause the wireless device to determine that the first grant-specific UL resource overlaps with another grant-specific UL resource having a lower priority than the first grant-specific UL resource. The processing circuitry is additionally configured to cause the wireless device to, upon determining that the first grant-specific UL resource overlaps with another grant-specific UL resource having a lower priority than the first grant-specific UL resource, deprioritize all grant-specific UL resources that overlap with the first grant-specific UL resource. According to some embodiments, the processing circuitry is further configured to cause the wireless device to perform any of the steps attributed to the wireless device in the above-disclosed methods.

BRIEF DESCRIPTION OF THE DRAWINGS

The accompanying drawing figures incorporated in and forming a part of this specification illustrate several aspects of the disclosure, and together with the description serve to explain the principles of the disclosure.

The accompanying drawing figures incorporated in and forming a part of this specification illustrate several aspects of the disclosure, and together with the description serve to explain the principles of the disclosure.

DETAILED DESCRIPTION

Figure 1:
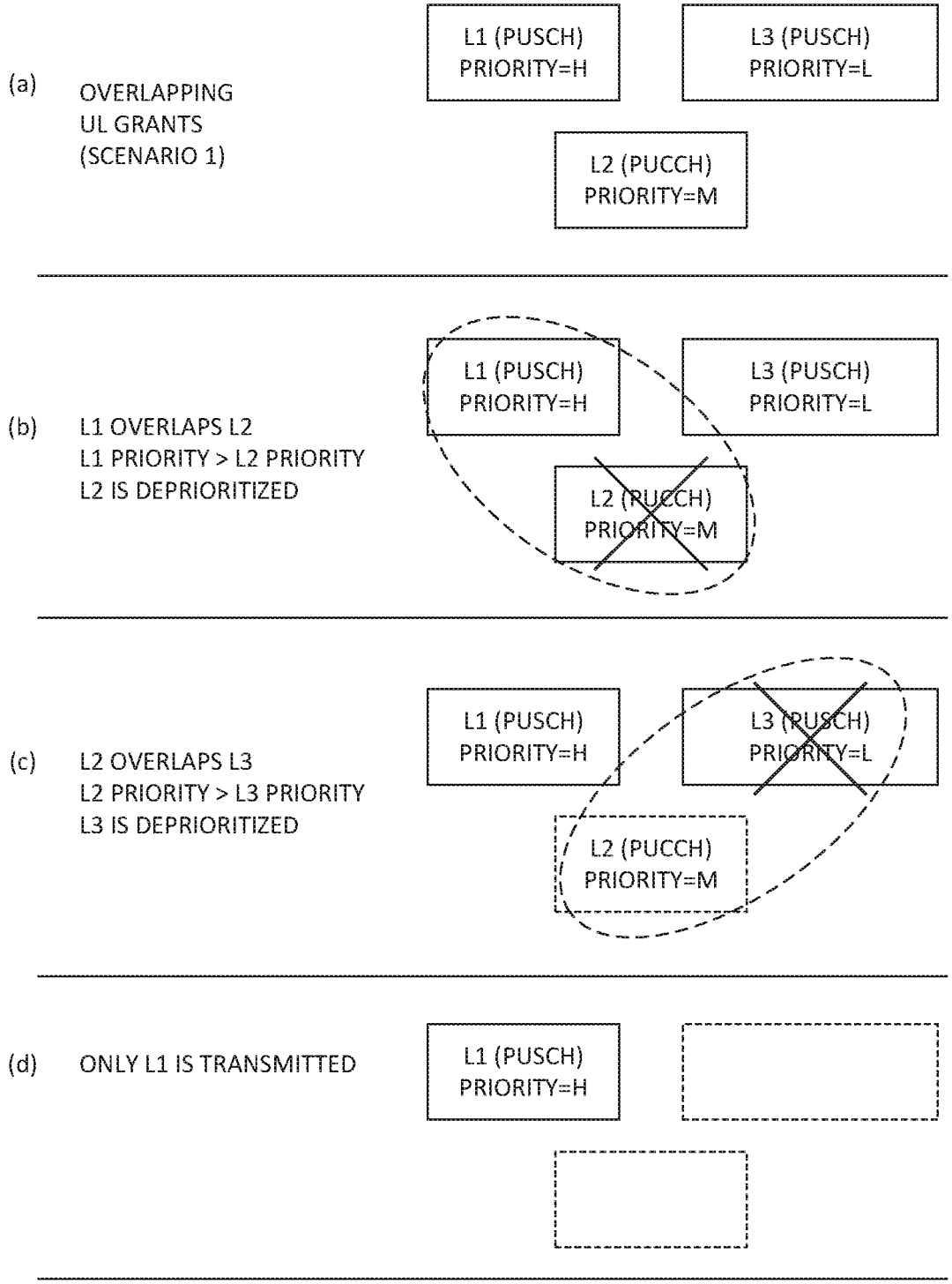
FIG. 1 illustrates a first problem scenario involving overlapping groups of transmissions with differing transmission priorities.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment (UE) device in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). In RP-190728, intra-UE multiplexing/prioritization has been discussed and specified. In the UL, Media Access Control (MAC) layer performs Logical Channel (LCH) and grants prioritization procedures based on a defined priority, i.e., the detailed description of such prioritization procedures in R2-1916352 as described above.

One issue which was not addressed in the current MAC solution in NR-IIoT release 16 is how to address the scenario in which overlapping occurs between two Physical Uplink Shared Channels (PUSCHs) (e.g., of high and low priority) and one Physical Uplink Control Channel (PUCCH) (e.g., of middle priority). Such overlapping grants are allocated via a gNB but processed by a UE.

Figure 2:
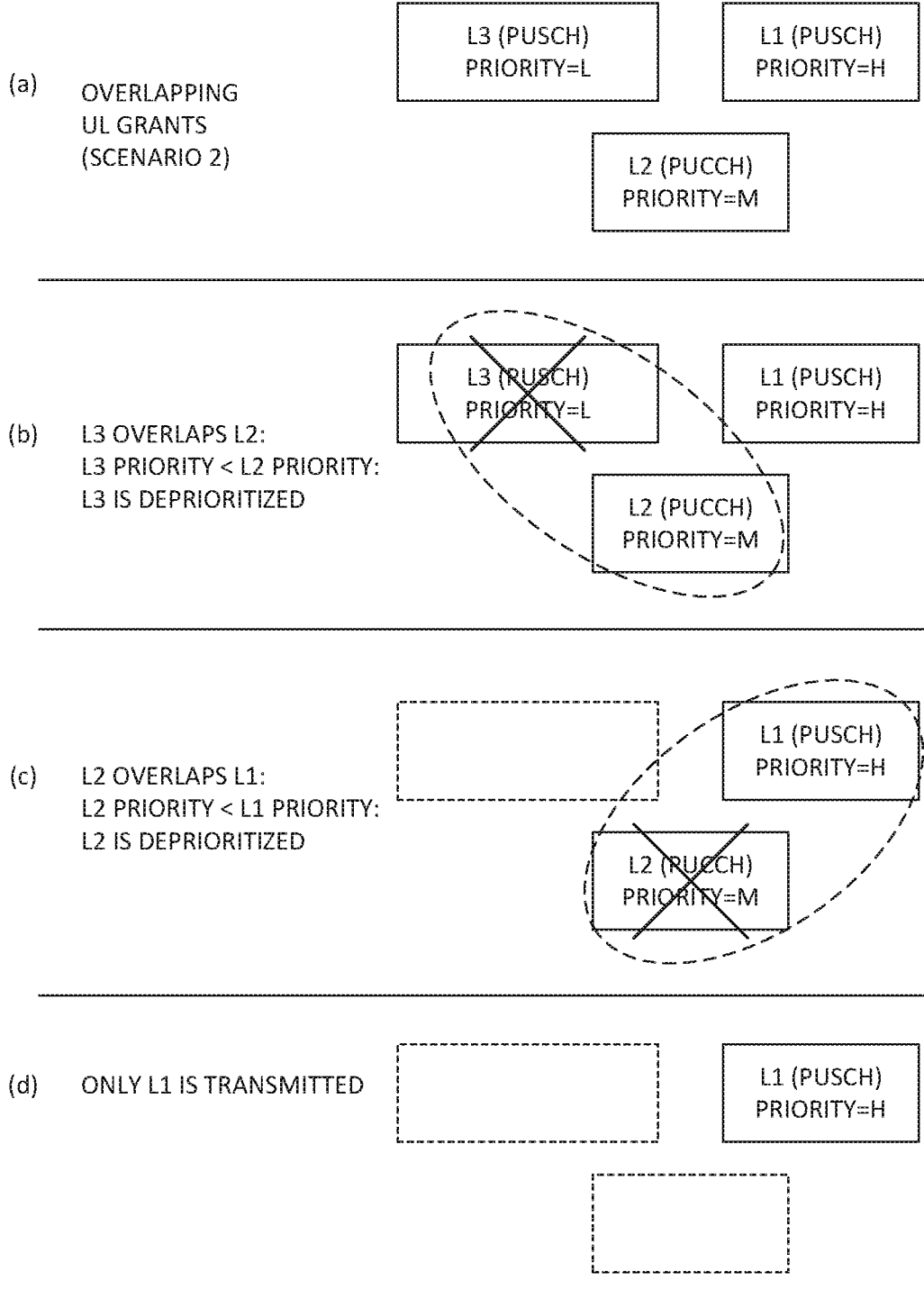
FIG. 2 illustrates a second problem scenario involving overlapping groups of transmissions with differing transmission priorities.

FIGS. 1 and 2 illustrate two different scenarios, each having two PUSCHs that overlap with a single PUCCH, and the inefficiencies of the conventional approach to prioritization. In each figure, L1 represents a critical grant in PUSCH on which high priority LCH data would be multiplexed, L2 represents a PUCCH transmission including a Scheduling Request (SR) associated with arrival of medium priority LCH data, and L3 represents a non-critical grant in PUSCH on which low priority LCH data would be multiplexed. It is presumed that all LCHs have data to transmit and that the UE knows this in advance for the last uplink resource L3 when processing the first uplink resource L1. FIGS. 1 and 2 illustrate how conventional prioritization is performed, and more specifically, show how the results of conventional prioritization are highly dependent upon the order in which the grants occur.

FIG. 1(a) shows a first problem scenario: high priority grant L1 overlaps with medium priority grant L2, and later in time medium priority grant L2 overlaps with low priority grant L3. FIG. 1(b) shows the first step of the conventional prioritization method: L1 and L2 are detected as overlapping, so their respective priorities are compared. Because L1 has higher priority than L2, L2 is deprioritized. FIG. 1(c) shows the next step of the conventional prioritization method: L2 and L3 are detected as overlapping, and L2 has higher priority than L3, so L3 is deprioritized. The result is that L1 is transmitted, as seen in FIG. 1(d).

FIG. 2(a) shows a second problem scenario: low priority grant L3 overlaps with medium priority grant L2, and later in time medium priority grant L2 overlaps with high priority grant L1. FIG. 2(b) show the first step of the conventional prioritization method: L3 and L2 are detected as overlapping, so their respective priorities are compared. Because L2 has higher priority than L3, L3 is deprioritized. FIG. 2(c) shows the next step of the conventional prioritization method: L2 and L1 are detected as overlapping, so their respective priorities are compared. Because L1 has higher priority than L2, L2 is deprioritized. FIG. 2(d) shows the result of the conventional prioritization method: only L1 is transmitted.

FIGS. 1 and 2 illustrate the point that the conventional prioritization method may in some scenarios suppress the transmission of a lower priority grant, such as L3, when it and a higher priority grant, such as L1, could otherwise both have been transmitted. In both of these problem scenarios, application of the conventional prioritization method could result in a non-optimal transmission.

Certain aspects of the present disclosure and their embodiments may provide solutions to the aforementioned or other challenges.

This subject matter of the present disclosure teaches methods for a UE to handle an overlapping of group of transmissions with differing MAC priorities, and UEs for same. The concepts disclosed herein are applicable at least in the context of Intra-UE prioritization for mixed Ultra-Reliable Low Latency Communications (URLLC) and eMBB industrial IoT operation.

There are, proposed herein, various embodiments which address one or more of the issues disclosed herein. Certain embodiments may provide one or more of the following technical advantage(s). This subject matter of the present disclosure optimizes the UE behavior for handling overlapping of group of transmission occasions. Without this subject matter of the present disclosure, a UE will have less spectral efficiency in some cases.

Figure 3:
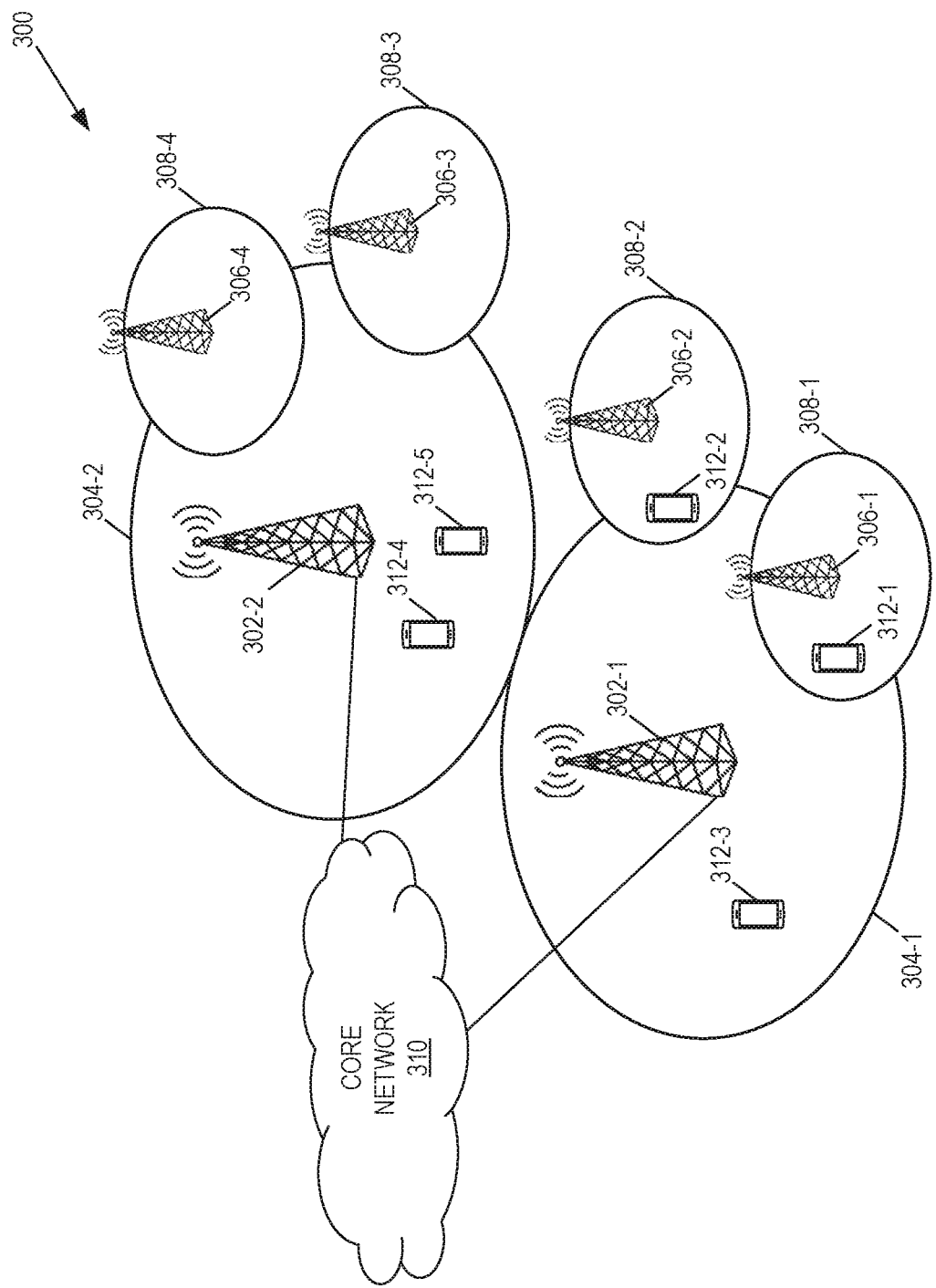
FIG. 3 illustrates one example of a cellular communications network, according to some embodiments of the present disclosure.

FIG. 3 illustrates one example of a cellular communications system 300 in which embodiments of the present disclosure may be implemented. In the embodiments described herein, the cellular communications system 300 is a 5G system (5GS) including a NR RAN or LTE RAN (i.e., E-UTRA RAN). In this example, the RAN includes base stations 302-1 and 302-2, which in LTE are referred to as eNBs (when connected to EPC) and in 5G NR are referred to as gNBs (e.g., LTE RAN nodes connected to 5GC, which are referred to as gn-eNBs), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

The subject matter disclosed herein provides methods and systems for handling an overlapping of group of transmissions with differing transmission priorities, including but not limited to, handling overlapping of multiple PUSCHs (e.g., 2-PUSCHs and 1-PUCCH).

Figure 4:
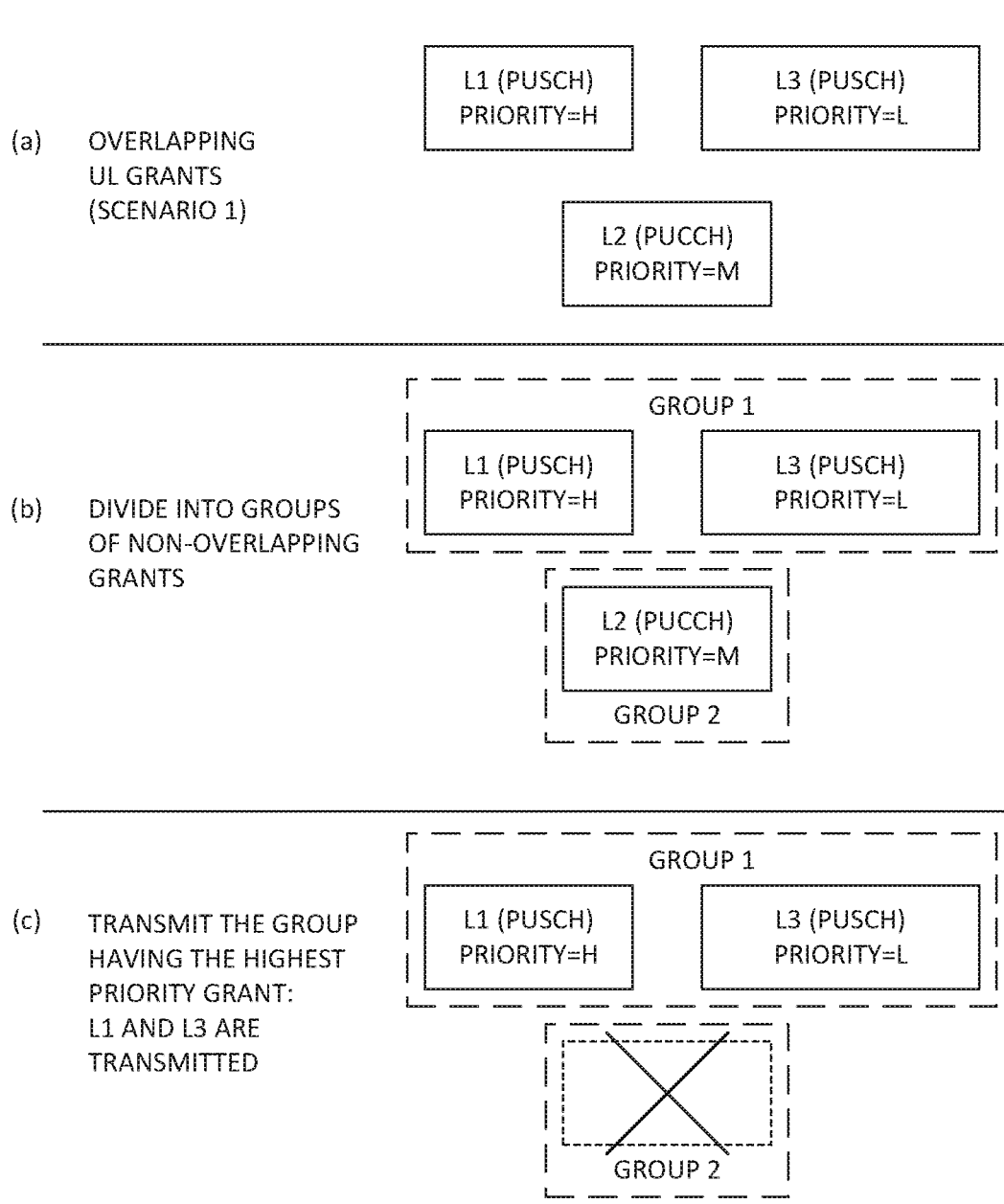
FIG. 4 illustrates an improved prioritization method based on grouping, according to some embodiments of the present disclosure.

FIG. 4 illustrates an improved prioritization method based on grouping, according to some embodiments of the present disclosure. FIG. 4(*a*) shows the first problem scenario, i.e., high priority grant L1 overlaps with medium priority grant L2, and later in time medium priority grant L2 overlaps with low priority grant L3. FIG. 4(*b*) shows the first step of the improved prioritization method: creating groups of non-overlapping grants. In FIG. 4(*b*), L1 and L3 are put into Group 1, and L2 is put into Group 2. Each group is assigned a priority. In some embodiments, each group is given a priority that is equal to the priority of the highest individual grant within that group. In FIG. 4(*b*), for example, Group 1 has a high priority and Group 2 has a medium priority. FIG. 4(*c*) shows the next step of the improved prioritization method: selecting the group the highest priority, which in this scenario is Group 1. As a result, L1 and L3 are transmitted. This selection may be performed according to the conventional approach but applied to select one of two groups rather than to select one of two grants. Specifically, the conventional approach considers the LCH associated with each group, rather than the LCH associated with each PUSCH/PUCCH UL resource, during prioritization.

Note that applying the improved prioritization method to the second problem scenario will have the same result, i.e., L1 and L3 will both be transmitted. Thus, unlike the conventional method, the order that the overlapping grants appear in time does not change the result, and thus the optimal solution can always be achieved.

If more than two groups are created, the conventional approach may be applied to the groups, i.e., by treating the groups in the same manner that individual grants would be treated, where the priority level for group is set to the priority level of the highest individual grant within that group.

In some embodiments, this method is performed only if it is detected that there are overlapping grants. In other embodiments, this method is always performed, and if there are no overlapping grants, then only one group will be created, in which case all of the grants are transmitted.

Figure 5:
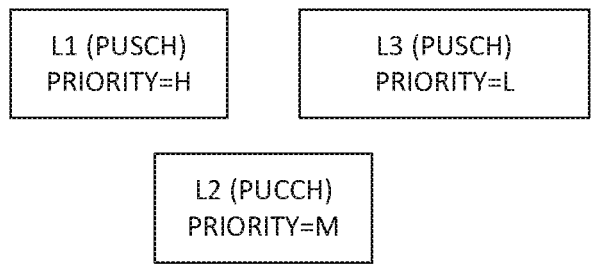
FIG. 5 illustrates another improved prioritization method based on selective discard, according to some embodiments of the present disclosure.
Figure 5:
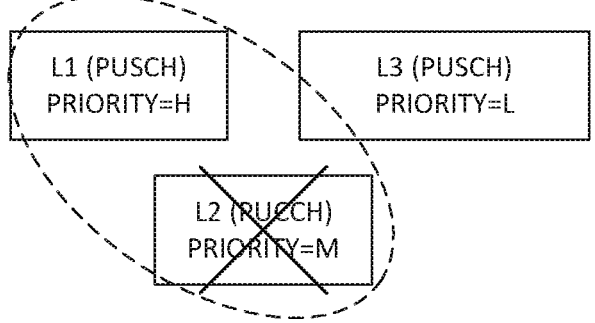
Figure 5:
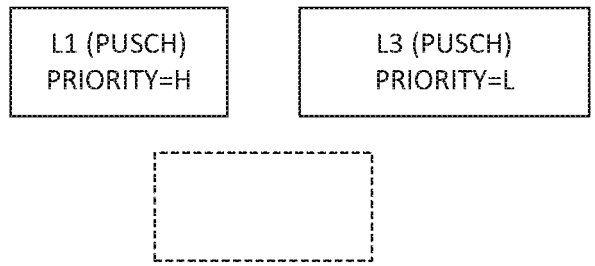

FIG. 5 illustrates another improved prioritization method based on selective discard, according to some embodiments of the present disclosure. FIG. 5 illustrates an alternative embodiment that does not involve grouping: once a resource is deprioritized, it is not considered again in a later prioritization stage. Referring the first problem scenario, for example, L1 and L2 are compared and L2 is deprioritized as having the lower priority and also removed from further consideration, and thus a comparison between L2 and L3 is not required. This results in both L1 and L3 being transmitted. This solution is not optimal for the second problem scenario, but avoids the overhead of creating groups of non-overlapping grants. Note that the same technique can also be applied to the grouping method, e.g., resources in a deprioritized group can be removed from further consideration.

In some embodiments, another (or second) prioritization process between the same two grants—e.g., caused by a later arrival of data in the LCH or due to time before the second grant—is still allowed. That is, a resource may be reconsidered, after it has been discarded, due to subsequent activity on the LCH.

Figure 6:
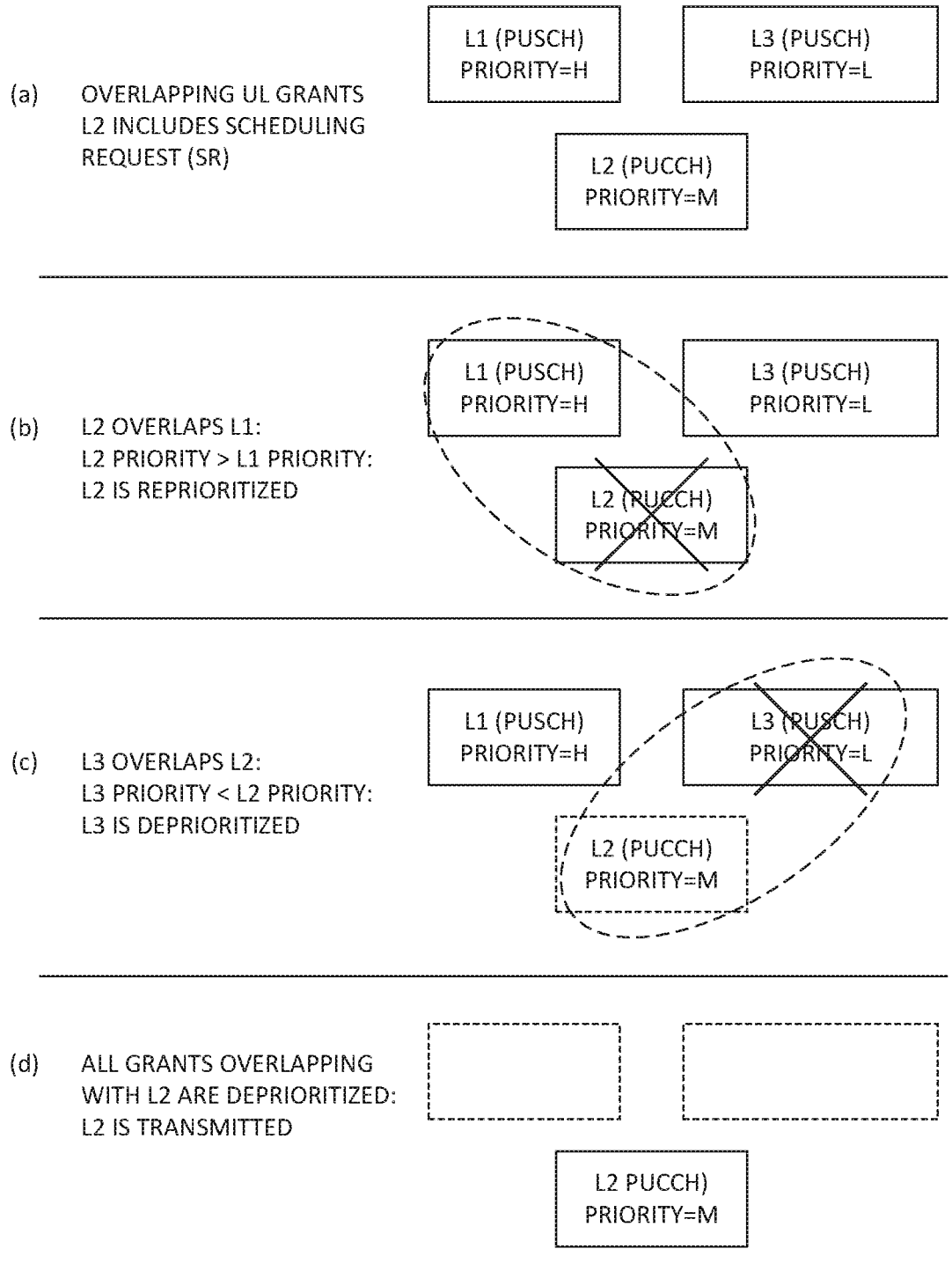
FIG. 6 illustrates another improved prioritization method based on Scheduling Request (SR) priority, according to some embodiments of the present disclosure.

FIG. 6 illustrates another improved prioritization method based on SR priority, according to some embodiments of the present disclosure. FIG. 6 illustrates yet another alternative solution that also does not involve grouping: if one of the overlapping grants contains an SR, the SR will be selected if it has a higher priority than any of the overlapping grants. That is, the SR does not have to have a higher priority than all of the grants that overlap it, it only has to have a higher priority than any one of the grants that overlap it. The result of this method is that in both the first and second problem scenarios, L2 will be transmitted, because L2 has a higher priority than at least one of its overlapping grants, e.g., L3.

In some embodiments, to determine whether or not to prioritize/deprioritize data transmission on PUSCHx of an uplink grant for the case where there is an overlapping PUCCH/SR, the prioritization procedure may include the following steps: first, check whether the PUCCH/SR has an LCH of higher priority compared to the LCHs of the PUSCHx for which the prioritization decision is being made; next, check whether the PUCCH/SR has on LCH of a higher priority than the LCHs supported using any/all other PUSCH resources (i.e., other than PUSCHx) for which data is available for transmission and that overlap with this PUCCH/SR resource.

In this manner, the PUCCH/SR is only prioritized if it has higher priority LCH data than that of the LCHs of any other uplink grant that overlaps with the PUCCH/SR. Otherwise, the PUCCH/SR is de-prioritized and uplink grants used to carry higher priority LCH data are prioritized above any overlapping grants used to carry lower priority data. This can be formulated as follows (for dynamic and configured grants): "if there is no overlapping PUCCH resource with an SR transmission where the priority of the logical channel that triggered the SR is higher than the priority of any other uplink grant overlapping with this PUCCH resource." The same principles may be applied to scenarios where overlapping occurs among more than three grants.

An example modification of Sections 5.4.1 and 5.4.4 of the pertinent MAC specification is shown below in Table 2:

TABLE 2

| Modification to Section 5.4.1 |
|---|
| 2> ... current conditions ... ; and |
| 2> if this uplink grant is not already a deprioritized uplink grant; |
| 3> this uplink grant is a prioritized uplink grant; |
| 3> the other overlapping uplink grant(s), if any, is a deprioritized uplink grant. |
| Modification to Section 5.4.4 |
| 3> if the MAC entity is configured with lch-basedPrioritization, and the PUCCH resource for the SR transmission occasion overlaps with any UL-SCH resource, and the priority of the logical channel that triggered SR is higher than the priority of the uplink grant for [[the]] any UL-SCH resource where the priority of the uplink grant is determined as specified in clause 5.4.1: |

In some embodiments, when conducting prioritization, all grant-specific uplink resources (i.e., PUSCH or PUCCH specific resources) which overlap within a specific duration, e.g., number of slots or number of OFDM symbols, are considered. Then, the LCH and associated grant that has the highest MAC Priority (e.g., as defined in R2-1916352) are selected for transmission. For purposes of discussion, the selected LCH and associated grant is herein referred to as a non-deprioritized transmission. Next, consider for transmission any additional LCH with an uplink resource that does not overlap with the non-deprioritized transmission.

In some embodiments, the future time horizon that the UE considers when doing comparison is predefined at the UE as a heuristic. In some embodiments, the amount of time that the UE can look ahead is a fixed duration. In alternative embodiments, the UE can look ahead a fixed number of uplink resources (e.g., three in the above example). In alternative embodiments, it can also be the maximum number of uplink resources in which UE is sure that the associating LCHs have data to transmit.

In some embodiments, the method used can be controlled by a gNB. For example, a gNB can send a signal (DCI, RRC, MAC CE, etc.) to identify which method should be used at any time. Example scenarios where the methods described herein may apply include, but are not limited to, any overlapping event where more than two uplink resources are involved in the overlapping, such as PUSCH allocated by different grants or PUCCH used for sending SRs.

Figure 7A:
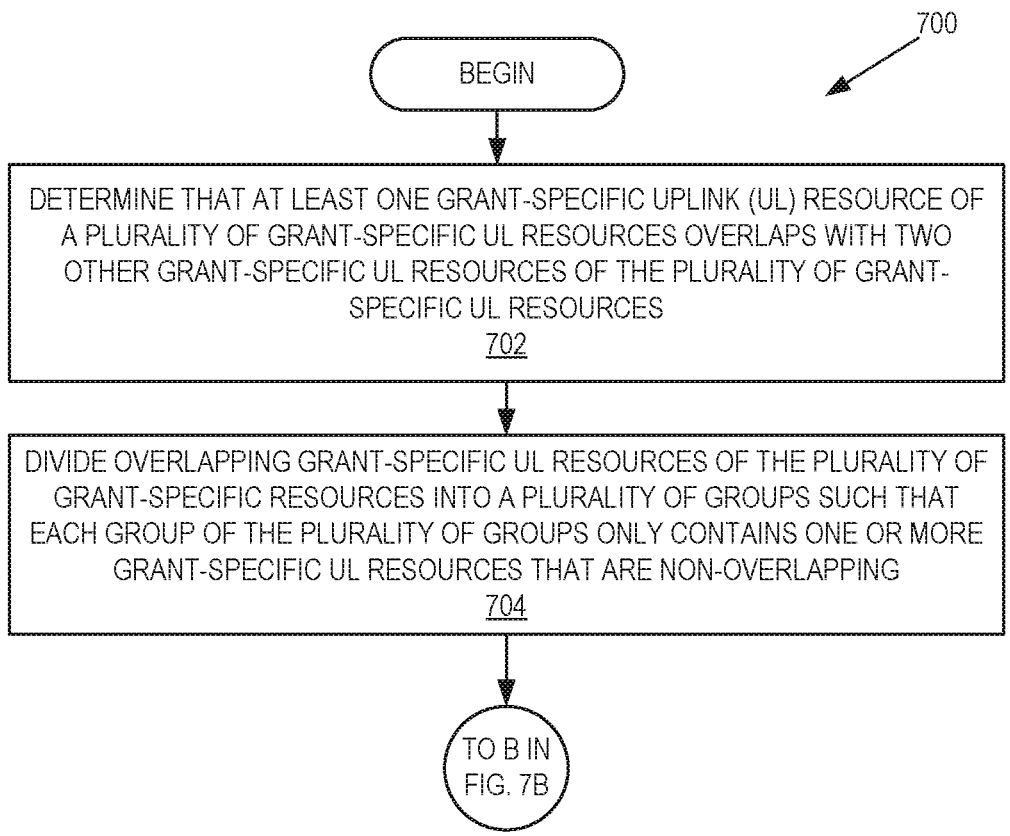
FIGS. 7A-7C are flowcharts illustrating exemplary operations for handling an overlapping group of transmissions with differing transmission priorities based on grouping, according to some embodiments.
Figure 7B:
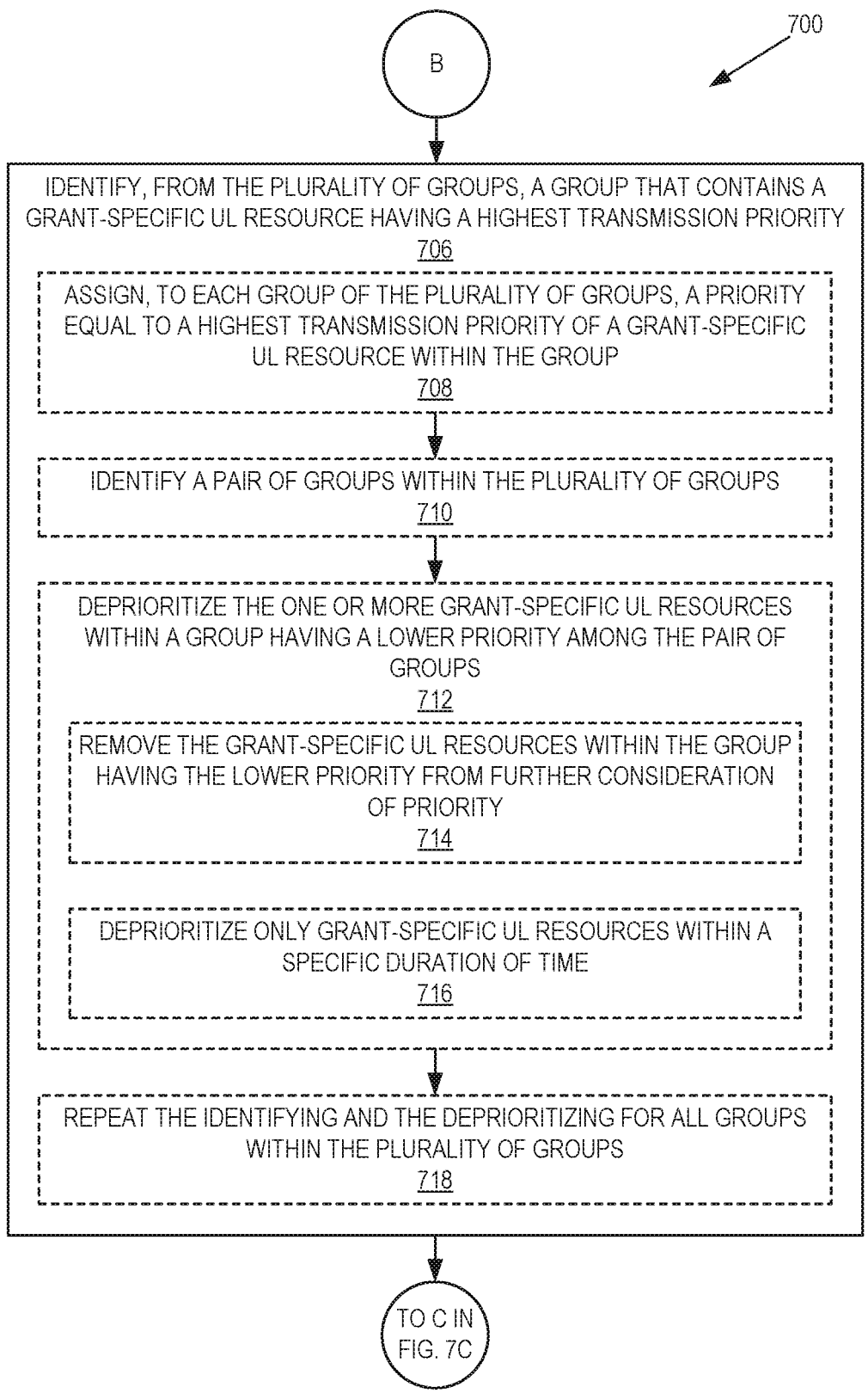
Figure 7C:
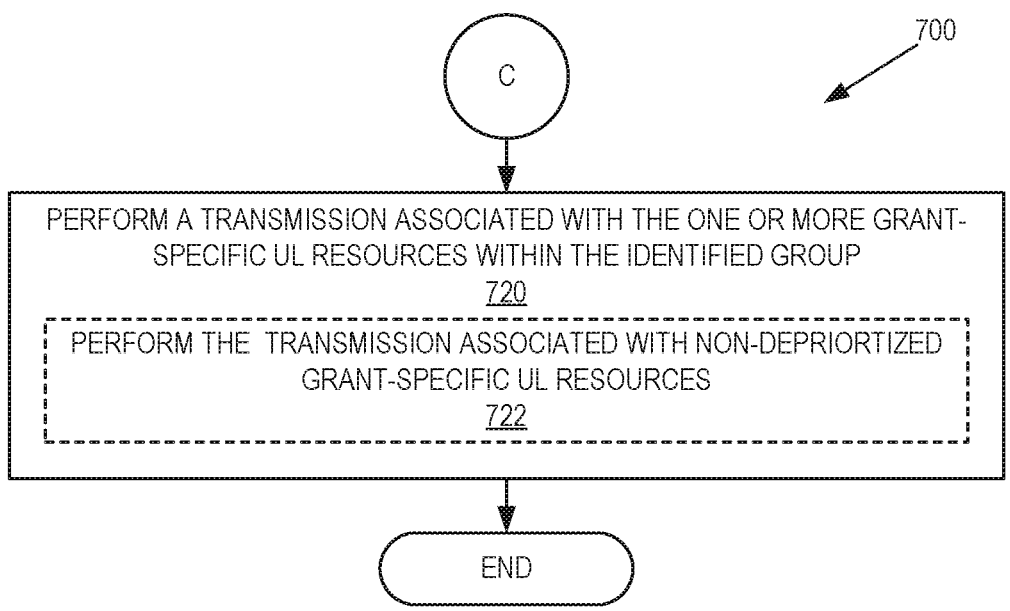

FIGS. 7A-7C provide a flowchart 700 to illustrate exemplary operations for handling an overlapping group of transmissions with differing transmission priorities based on grouping, according to some embodiments. Operations begin in FIG. 7A with a wireless device (e.g., one of the wireless communication devices 312-1 through 312-5 of FIG. 3) determining that at least one grant-specific UL resource (such as L2 of FIG. 4) of a plurality of grant-specific UL resources overlaps with two other grant-specific UL resources (e.g., L1 and L3 of FIG. 4) of the plurality of grant-specific UL resources (block 702). The wireless device divides overlapping grant-specific UL resources of the plurality of grant-specific resources into a plurality of groups (e.g., GROUP1 and GROUP2 of FIG. 4) such that each group of the plurality of groups only contains one or more grant-specific UL resources that are non-overlapping (block 704). Operations then continue at block 706 of FIG. 7B.

Referring now to FIG. 7B, the wireless device identifies, from the plurality of groups, a group that contains a grant-specific UL resource having a highest transmission priority (e.g., GROUP1 of FIG. 4) (block 706). In some embodiments, the operations of block 706 for identifying the group that contains the grant-specific IL resource having the highest transmission priority may comprise the wireless device assigning, to each group of the plurality of groups, a priority equal to a highest transmission priority of a grant-specific UL resource within the group (block 708). The wireless device next identifies a pair of groups within the plurality of groups (block 710). The wireless device deprioritizes the one or more grant-specific UL resources within a group having a lower priority among the pair of groups (block 712). According to some embodiments, the operations of block 712 for deprioritizing the one or more grant-specific UL resources may comprise removing the grant-specific UL resources within the group having the lower priority from further consideration of priority (block 714). Some embodiments may provide that the operations of block 712 for deprioritizing the one or more gran-specific UL resources comprise deprioritize only grant-specific UL resources within a specific duration of time (block 716). The wireless device then repeats the identifying and the deprioritizing for all groups within the plurality of groups (block 718). Operations then continue at block 720 of FIG. 7C.

Turning now to FIG. 7C, the wireless device performs a transmission associated with the one or more grant-specific UL resources within the identified group (block 720). In some embodiments, the operations of block 720 for performing the transmission may comprise performing the transmission associated with non-deprioritized grant-specific UL resources (block 722)

Figure 8:
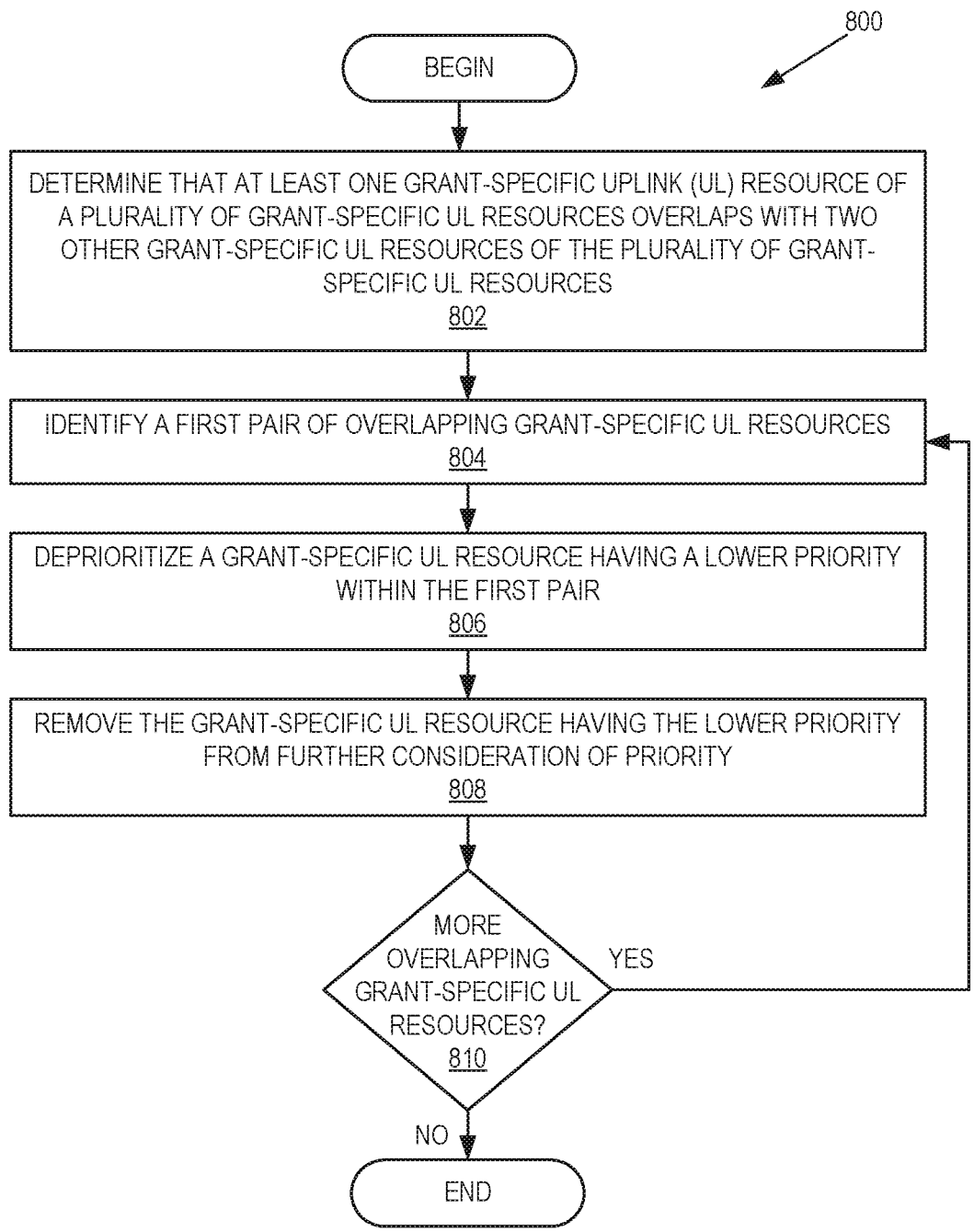
FIG. 8 is a flowchart illustrating exemplary operations for handling an overlapping group of transmissions with differing transmission priorities based on selective discard, according to some embodiments.

FIG. 8 provides a flowchart 800 to illustrate exemplary operations for handling an overlapping group of transmissions with differing transmission priorities based on selective discard, according to some embodiments. In FIG. 8, operations begin with a wireless device (e.g., one of the wireless communication devices 312-1 through 312-5 of FIG. 3) determining that at least one grant-specific UL resource (such as L2 of FIG. 5) of a plurality of grant-specific UL resources overlaps with two other grant-specific UL resources (e.g., L1 and L3 of FIG. 5) of the plurality of grant-specific UL resources (block 802). The wireless device next identifies a first pair of overlapping grant-specific UL resources (such as L1 and L2 of FIG. 5) (block 804). The wireless device then deprioritizes a grant-specific UL resource having a lower priority within the first pair (block 806). The wireless device also removes the grant-specific UL resource having the lower priority from further consideration of priority (block 808). The wireless device then determines whether more overlapping grant-specific UL resources exist (block 810). If so, operations continue at block 804. Otherwise, processing is complete.

Figure 9A:
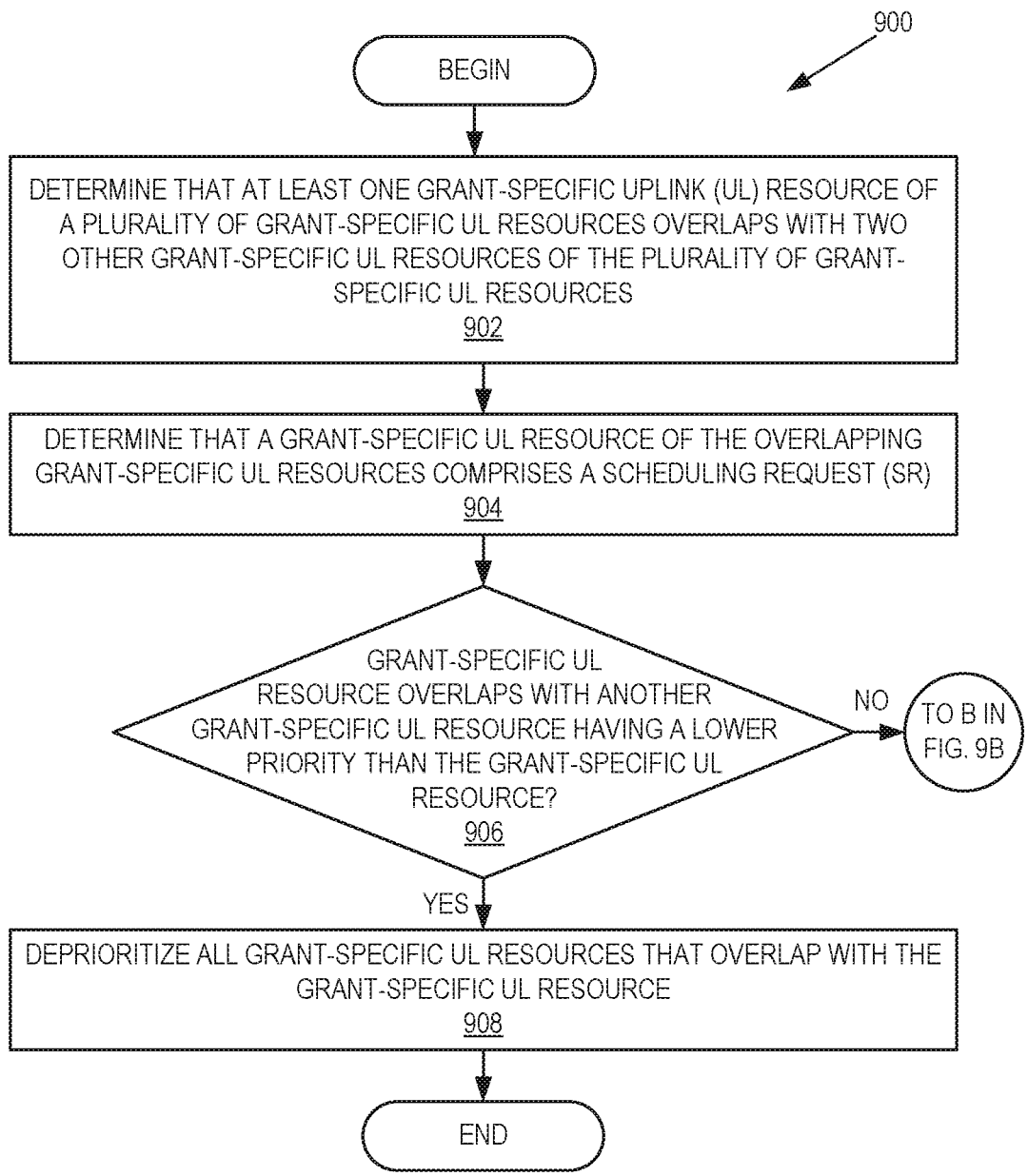
FIGS. 9A-9B are flowcharts illustrating exemplary operations for handling an overlapping group of transmissions with differing transmission priorities based on SR priority, according to some embodiments.
Figure 9B:
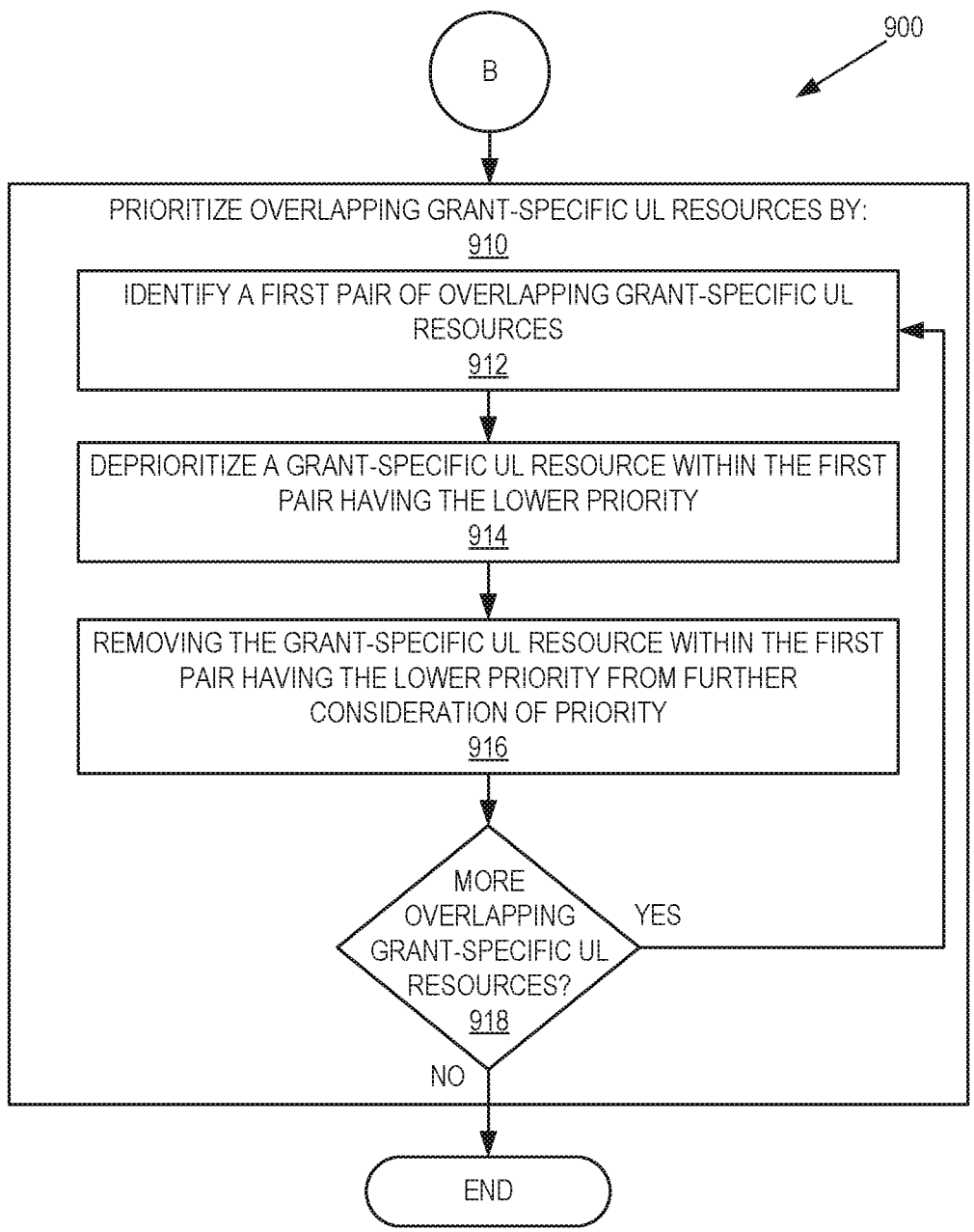

FIGS. 9A-9B provide a flowchart 900 to illustrate exemplary operations for handling an overlapping group of transmissions with differing transmission priorities based on SR priority, according to some embodiments. Operations in FIG. 9A begin with a wireless device (e.g., one of the wireless communication devices 312-1 through 312-5 of FIG. 3) determining that at least one grant-specific UL resource (such as L2 of FIG. 6) of a plurality of grant-specific UL resources overlaps with two other grant-specific UL resources (e.g., L1 and L3 of FIG. 6) of the plurality of grant-specific UL resources (block 902). The wireless device next determines that a grant-specific UL resource of the overlapping grant-specific UL resources (e.g., L2 of FIG. 6) comprises an SR (block 904). The wireless device then determines whether a grant-specific UL resource overlaps with another grant-specific UL resource having a lower priority than the grant-specific UL resource (such as L3 of FIG. 6) (block 906). If so, the wireless device deprioritizes all grant-specific UL resources that overlap with the grant-specific UL resource (block 908). However, if the wireless device determines at decision block 906 that no grant-specific UL resource overlaps with another grant-specific UL resource having a lower priority than the grant-specific UL resource, operations continue at block 910 of FIG. 9B.

Referring now to FIG. 9B, the wireless device performs a series of operations to prioritize overlapping grant-specific UL resources (block 910). The wireless device first identifies a first pair of overlapping grant-specific UL resources (block 912). The wireless device then deprioritizes a grant-specific UL resource within the first pair having the lower priority (block 914). The wireless device also removes the grant-specific UL resource within the first pair having the lower priority from further consideration of priority (block 916). The wireless device determines whether more overlapping grant-specific UL resources exist (block 918). If so, operations resume at block 912. Otherwise, processing is complete.

Figure 10:
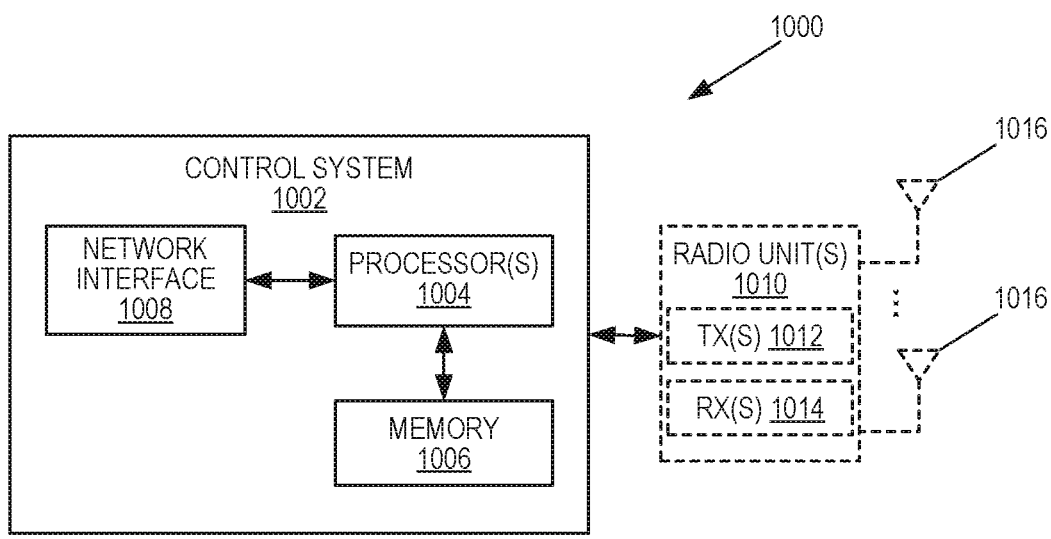
FIG. 10 is a schematic block diagram of a radio access node according to some embodiments of the present disclosure.

FIG. 10 is a schematic block diagram of a radio access node 1000 according to some embodiments of the present disclosure. Optional features are represented by dashed boxes. The radio access node 1000 may be, for example, a base station 302 or 306 or a network node that implements all or part of the functionality of the base station 302 or gNB described herein. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of a radio access node 1000 as described herein. In some embodiments, the function(s) are implemented in software that is stored, e.g., in the memory 1006 and executed by the one or more processors 1004.

Figure 11:
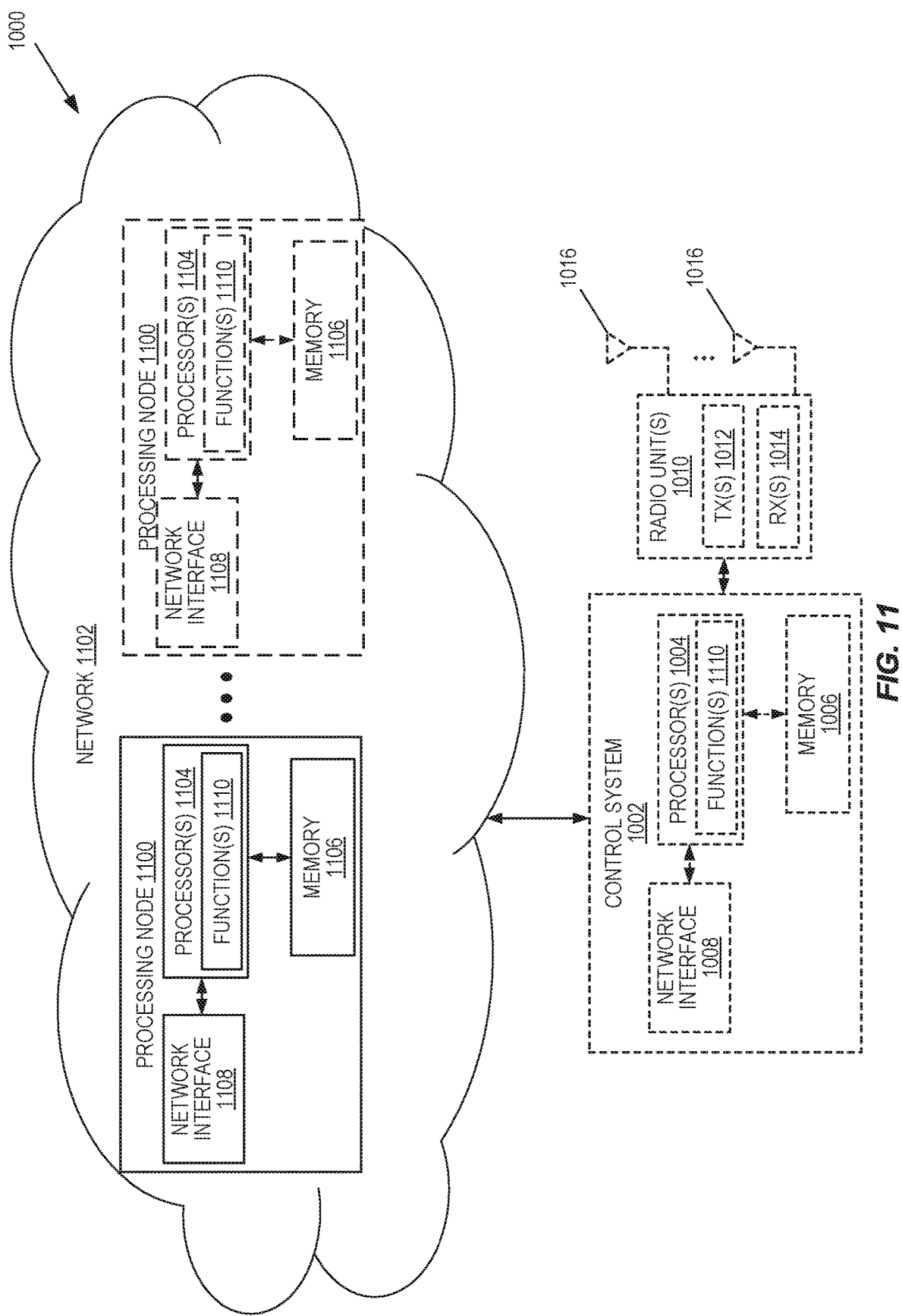
FIG. 11 is a schematic block diagram that illustrates a virtualized embodiment of the radio access node of FIG. 10 according to some embodiments of the present disclosure.

FIG. 11 is a schematic block diagram that illustrates a virtualized embodiment of the radio access node 1000 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like. The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICs, FPGAS, and/or the like), memory 1106, and a network interface 1108.

In this example, functions 1110 of the radio access node 1000 described herein are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
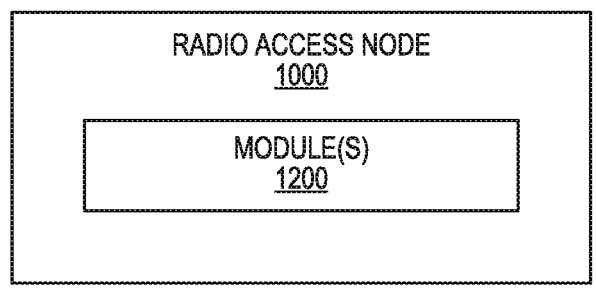
FIG. 12 is a schematic block diagram of the radio access node of FIG. 10 according to some other embodiments of the present disclosure.

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Figure 13:
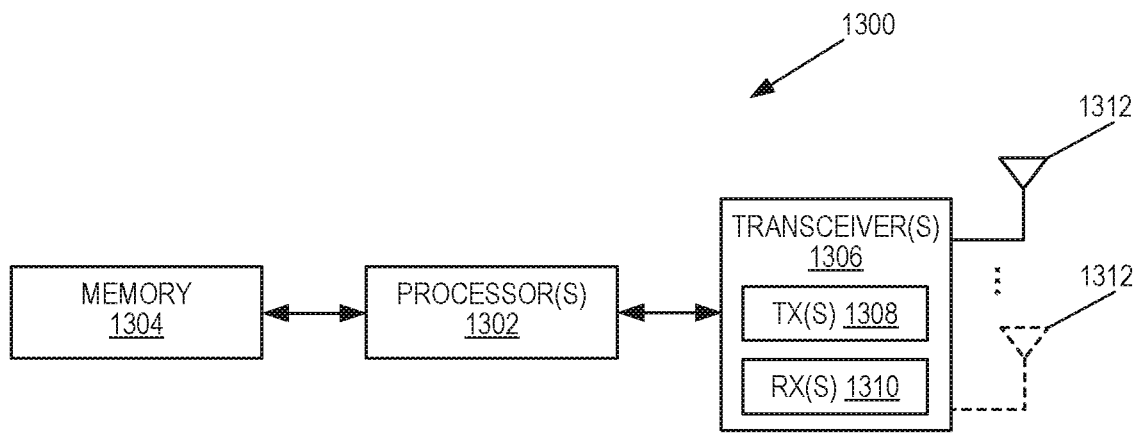
FIG. 13 is a schematic block diagram of a User Equipment device (UE) according to some embodiments of the present disclosure.

FIG. 13 is a schematic block diagram of a wireless communication device 1300 according to some embodiments of the present disclosure. As illustrated, the wireless communication device 1300 includes one or more processors 1302 (e.g., CPUs, ASICs, FPGAs, and/or the like), memory 1304, and one or more transceivers 1306 each including one or more transmitters 1308 and one or more receivers 1310 coupled to one or more antennas 1312. The transceiver(s) 1306 includes radio-front end circuitry connected to the antenna(s) 1312 that is configured to condition signals communicated between the antenna(s) 1312 and the processor(s) 1302, as will be appreciated by on of ordinary skill in the art. The processors 1302 are also referred to herein as processing circuitry. The transceivers 1306 are also referred to herein as radio circuitry. In some embodiments, the functionality of the wireless communication device 1300 described above may be fully or partially implemented in software that is, e.g., stored in the memory 1304 and executed by the processor(s) 1302. Note that the wireless communication device 1300 may include additional components not illustrated in FIG. 13 such as, e.g., one or more user interface components (e.g., an input/output interface including a display, buttons, a touch screen, a microphone, a speaker(s), and/or the like and/or any other components for allowing input of information into the wireless communication device 1300 and/or allowing output of information from the wireless communication device 1300), a power supply (e.g., a battery and associated power circuitry), etc.

In some embodiments, a computer program including instructions which, when executed by at least one processor, causes the at least one processor to carry out the functionality of the wireless communication device 1300 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
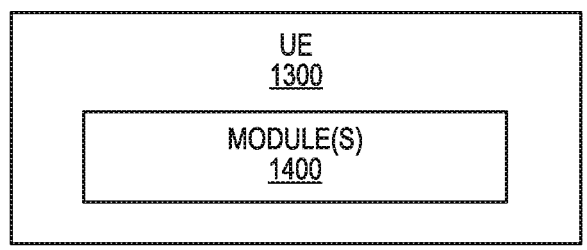
FIG. 14 is a schematic block diagram of the UE of FIG. 13 according to some other embodiments of the present disclosure.

FIG. 14 is a schematic block diagram of the wireless communication device 1300 according to some other embodiments of the present disclosure. The wireless communication device 1300 includes one or more modules 1400, each of which is implemented in software. The module(s) 1400 provide the functionality of the wireless communication device 1300 described herein.

Figure 15:
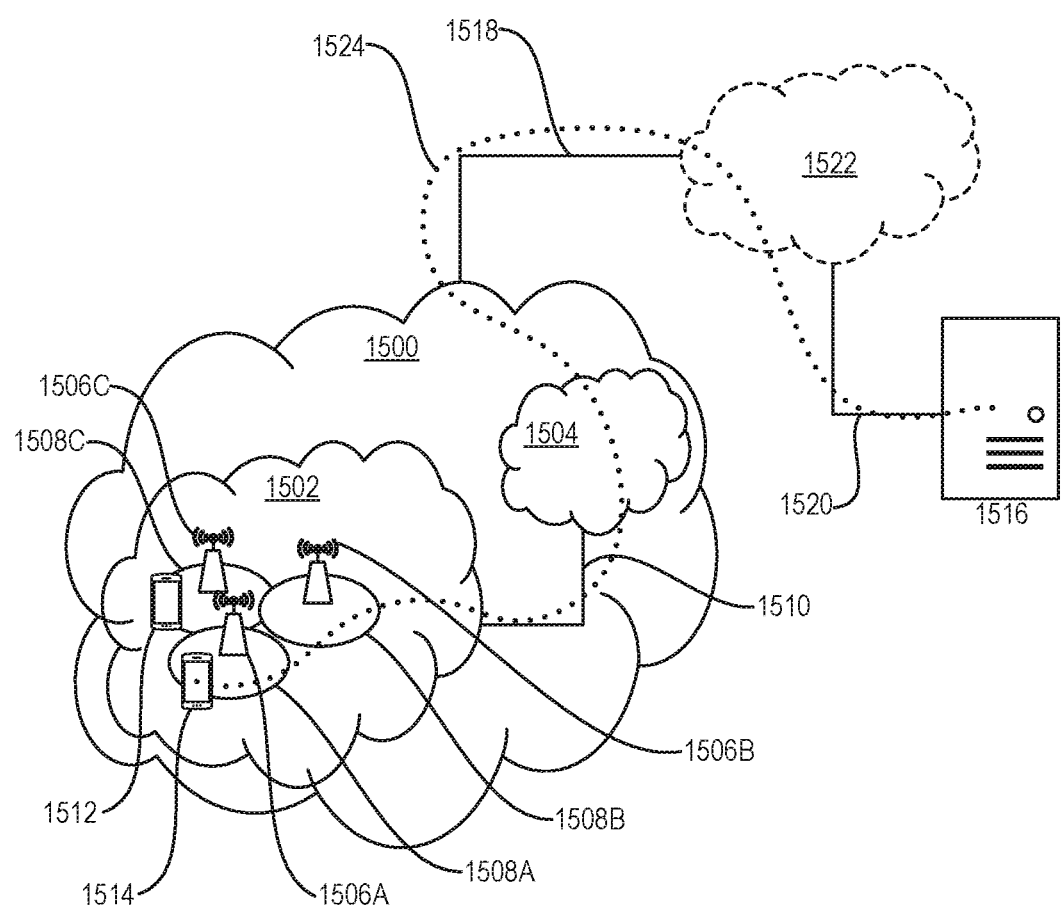
FIG. 15 illustrates a telecommunication network connected via an intermediate network to a host computer in accordance with some embodiments of the present disclosure.

With reference to FIG. 15, in accordance with an embodiment, a communication system includes a telecommunication network 1500, such as a 3GPP-type cellular network, which comprises an access network 1502, such as a RAN, and a core network 1504. The access network 1502 comprises a plurality of base stations 1506A, 1506B, 1506C, such as Node Bs, eNBs, gNBs, or other types of wireless Access Points (APs), each defining a corresponding coverage area 1508A, 1508B, 1508C. Each base station 1506A, 1506B, 1506C is connectable to the core network 1504 over a wired or wireless connection 1510. A first UE 1512 located in coverage area 1508C is configured to wirelessly connect to, or be paged by, the corresponding base station 1506C. A second UE 1514 in coverage area 1508A is wirelessly connectable to the corresponding base station 1506A. While a plurality of UEs 1512, 1514 are illustrated in this example, the disclosed embodiments are equally applicable to a situation where a sole UE is in the coverage area or where a sole UE is connecting to the corresponding base station 1506.

The telecommunication network 1500 is itself connected to a host computer 1516, which may be embodied in the hardware and/or software of a standalone server, a cloud-implemented server, a distributed server, or as processing resources in a server farm. The host computer 1516 may be under the ownership or control of a service provider, or may be operated by the service provider or on behalf of the service provider. Connections 1518 and 1520 between the telecommunication network 1500 and the host computer 1516 may extend directly from the core network 1504 to the host computer 1516 or may go via an optional intermediate network 1522. The intermediate network 1522 may be one of, or a combination of more than one of, a public, private, or hosted network; the intermediate network 1522, if any, may be a backbone network or the Internet; in particular, the intermediate network 1522 may comprise two or more sub-networks (not shown).

The communication system of FIG. 15 as a whole enables connectivity between the connected UEs 1512, 1514 and the host computer 1516. The connectivity may be described as an Over-the-Top (OTT) connection 1524. The host computer 1516 and the connected UEs 1512, 1514 are configured to communicate data and/or signaling via the OTT connection 1524, using the access network 1502, the core network 1504, any intermediate network 1522, and possible further infrastructure (not shown) as intermediaries. The OTT connection 1524 may be transparent in the sense that the participating communication devices through which the OTT connection 1524 passes are unaware of routing of uplink and downlink communications. For example, the base station 1506 may not or need not be informed about the past routing of an incoming downlink communication with data originating from the host computer 1516 to be forwarded (e.g., handed over) to a connected UE 1512. Similarly, the base station 1506 need not be aware of the future routing of an outgoing uplink communication originating from the UE 1512 towards the host computer 1516.

Example implementations, in accordance with an embodiment, of the UE, base station, and host computer discussed in the preceding paragraphs will now be described with reference to FIG. 16. In a communication system 1600, a host computer 1602 comprises hardware 1604 including a communication interface 1606 configured to set up and maintain a wired or wireless connection with an interface of a different communication device of the communication system 1600. The host computer 1602 further comprises processing circuitry 1608, which may have storage and/or processing capabilities. In particular, the processing circuitry 1608 may comprise one or more programmable processors, ASICs, FPGAs, or combinations of these (not shown) adapted to execute instructions. The host computer 1602 further comprises software 1610, which is stored in or accessible by the host computer 1602 and executable by the processing circuitry 1608. The software 1610 includes a host application 1612. The host application 1612 may be operable to provide a service to a remote user, such as a UE 1614 connecting via an OTT connection 1616 terminating at the UE 1614 and the host computer 1602. In providing the service to the remote user, the host application 1612 may provide user data which is transmitted using the OTT connection 1616.

The communication system 1600 further includes a base station 1618 provided in a telecommunication system and comprising hardware 1620 enabling it to communicate with the host computer 1602 and with the UE 1614. The hardware 1620 may include a communication interface 1622 for setting up and maintaining a wired or wireless connection with an interface of a different communication device of the communication system 1600, as well as a radio interface 1624 for setting up and maintaining at least a wireless connection 1626 with the UE 1614 located in a coverage area (not shown in FIG. 16) served by the base station 1618. The communication interface 1622 may be configured to facilitate a connection 1628 to the host computer 1602. The connection 1628 may be direct or it may pass through a core network (not shown in FIG. 16) of the telecommunication system and/or through one or more intermediate networks outside the telecommunication system. In the embodiment shown, the hardware 1620 of the base station 1618 further includes processing circuitry 1630, which may comprise one or more programmable processors, ASICs, FPGAs, or combinations of these (not shown) adapted to execute instructions. The base station 1618 further has software 1632 stored internally or accessible via an external connection.

The communication system 1600 further includes the UE 1614 already referred to. The UE's 1614 hardware 1634 may include a radio interface 1636 configured to set up and maintain a wireless connection 1626 with a base station serving a coverage area in which the UE 1614 is currently located. The hardware 1634 of the UE 1614 further includes processing circuitry 1638, which may comprise one or more programmable processors, ASICs, FPGAs, or combinations of these (not shown) adapted to execute instructions. The UE 1614 further comprises software 1640, which is stored in or accessible by the UE 1614 and executable by the processing circuitry 1638. The software 1640 includes a client application 1642. The client application 1642 may be operable to provide a service to a human or non-human user via the UE 1614, with the support of the host computer 1602. In the host computer 1602, the executing host application 1612 may communicate with the executing client application 1642 via the OTT connection 1616 terminating at the UE 1614 and the host computer 1602. In providing the service to the user, the client application 1642 may receive request data from the host application 1612 and provide user data in response to the request data. The OTT connection 1616 may transfer both the request data and the user data. The client application 1642 may interact with the user to generate the user data that it provides.

Figure 16:
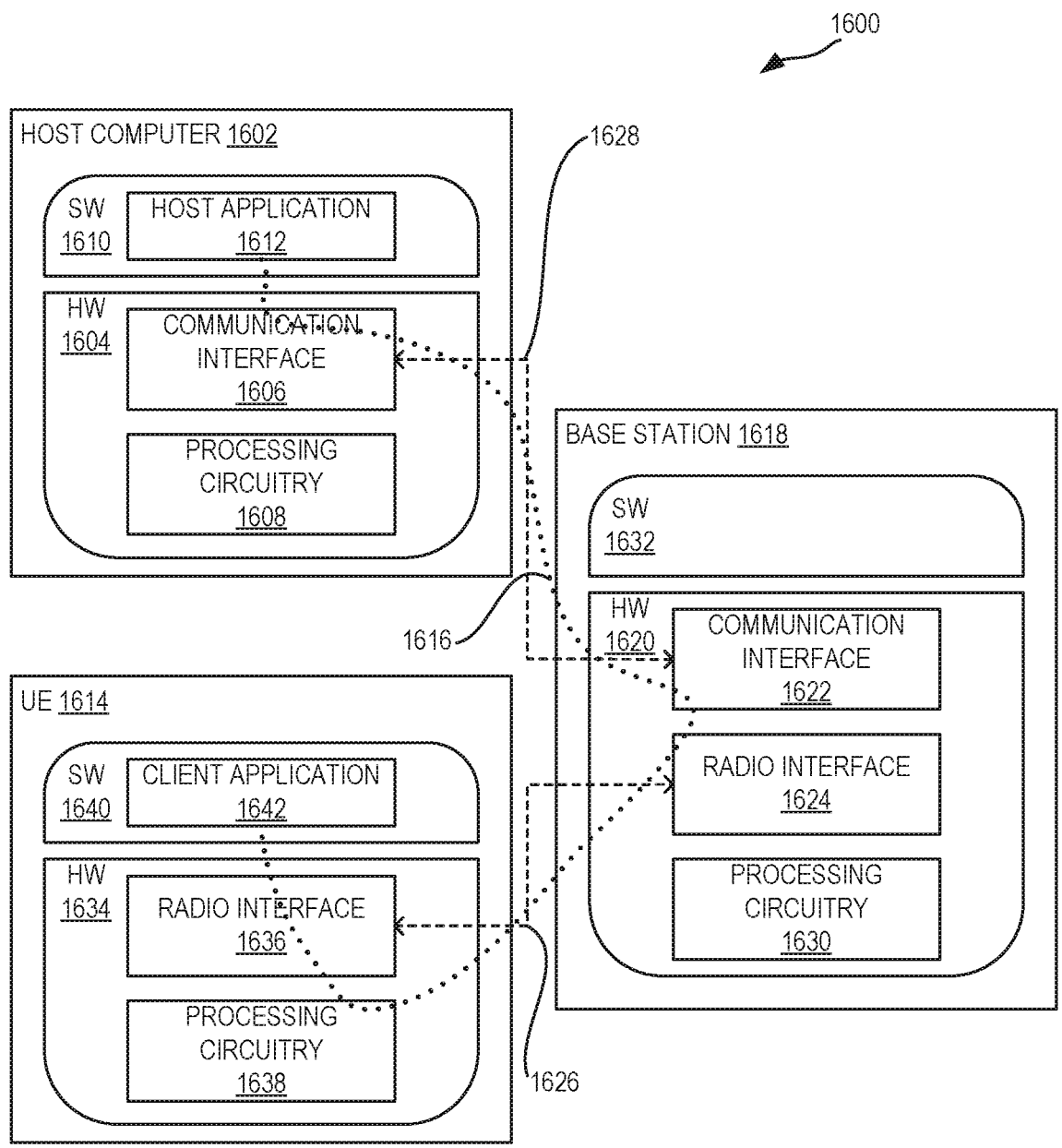
FIG. 16 is a generalized block diagram of a host computer communicating via a base station with a UE over a partially wireless connection in accordance with some embodiments of the present disclosure.

It is noted that the host computer 1602, the base station 1618, and the UE 1614 illustrated in FIG. 16 may be similar or identical to the host computer 1516, one of the base stations 1506A, 1506B, 1506C, and one of the UEs 1512, 1514 of FIG. 15, respectively. This is to say, the inner workings of these entities may be as shown in FIG. 16 and independently, the surrounding network topology may be that of FIG. 15.

In FIG. 16, the OTT connection 1616 has been drawn abstractly to illustrate the communication between the host computer 1602 and the UE 1614 via the base station 1618 without explicit reference to any intermediary devices and the precise routing of messages via these devices. The network infrastructure may determine the routing, which may be configured to hide from the UE 1614 or from the service provider operating the host computer 1602, or both. While the OTT connection 1616 is active, the network infrastructure may further take decisions by which it dynamically changes the routing (e.g., on the basis of load balancing consideration or reconfiguration of the network).

The wireless connection 1626 between the UE 1614 and the base station 1618 is in accordance with the teachings of the embodiments described throughout this disclosure. One or more of the various embodiments improve the performance of OTT services provided to the UE 1614 using the OTT connection 1616, in which the wireless connection 1626 forms the last segment. More precisely, the teachings of these embodiments may improve the efficiency of overlapping grant prioritization by the UE and thereby provide benefits such as increased throughput and reduced latency of data from the UE.

A measurement procedure may be provided for the purpose of monitoring data rate, latency, and other factors on which the one or more embodiments improve. There may further be an optional network functionality for reconfiguring the OTT connection 1616 between the host computer 1602 and the UE 1614, in response to variations in the measurement results. The measurement procedure and/or the network functionality for reconfiguring the OTT connection 1616 may be implemented in the software 1610 and the hardware 1604 of the host computer 1602 or in the software 1640 and the hardware 1634 of the UE 1614, or both. In some embodiments, sensors (not shown) may be deployed in or in association with communication devices through which the OTT connection 1616 passes; the sensors may participate in the measurement procedure by supplying values of the monitored quantities exemplified above, or supplying values of other physical quantities from which the software 1610, 1640 may compute or estimate the monitored quantities. The reconfiguring of the OTT connection 1616 may include message format, retransmission settings, preferred routing, etc.; the reconfiguring need not affect the base station 1618, and it may be unknown or imperceptible to the base station 1618. Such procedures and functionalities may be known and practiced in the art. In certain embodiments, measurements may involve proprietary UE signaling facilitating the host computer 1602's measurements of throughput, propagation times, latency, and the like. The measurements may be implemented in that the software 1610 and 1640 causes messages to be transmitted, in particular empty or 'dummy' messages, using the OTT connection 1616 while it monitors propagation times, errors, etc.

Figures 17, 18:
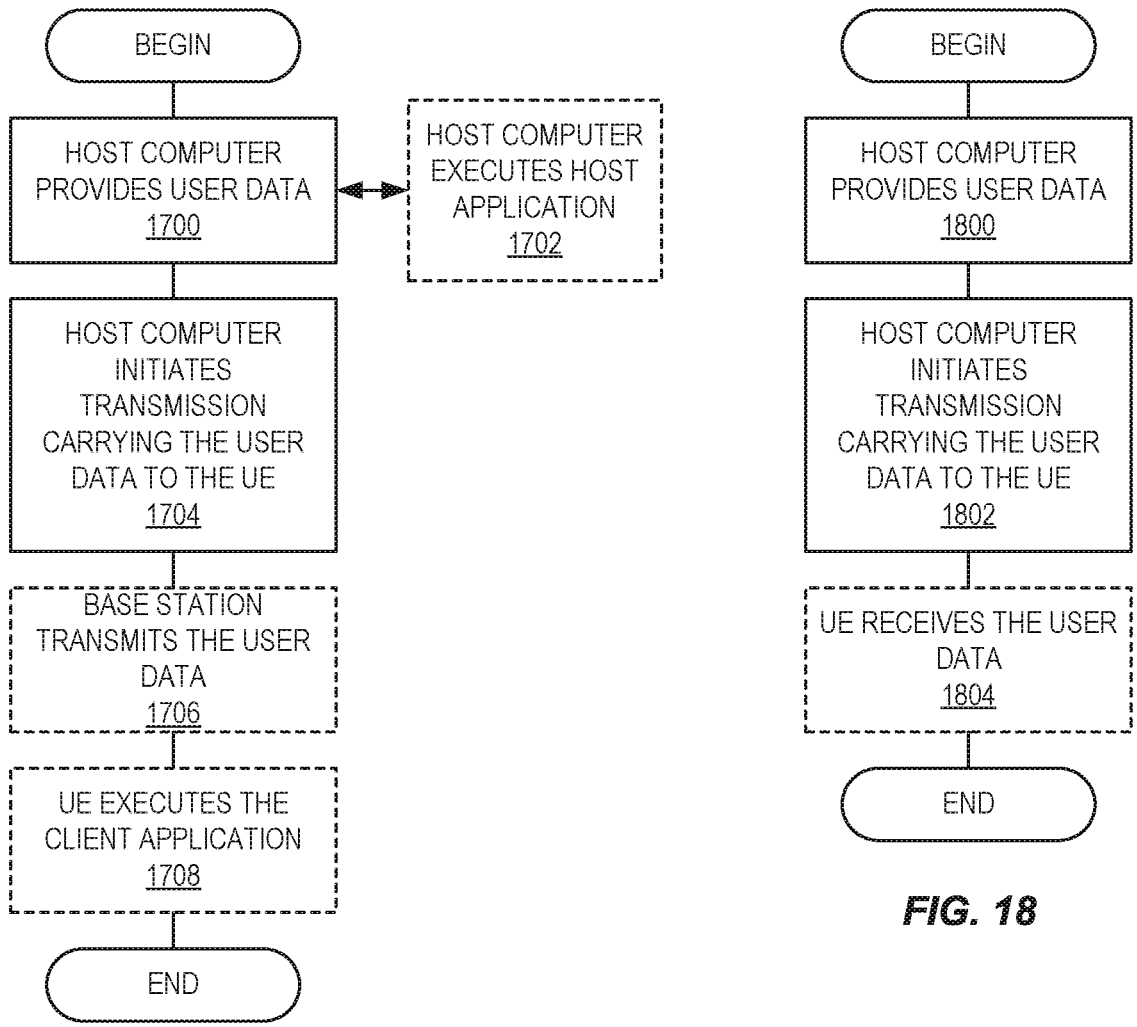
FIG. 17 is a flowchart illustrating a method implemented in a communication system in accordance with one embodiment of the present disclosure.
FIG. 18 is a flowchart illustrating a method implemented in a communication system in accordance with one embodiment of the present disclosure.

FIG. 17 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 17 will be included in this section. In step 1700, the host computer provides user data. In sub-step 1702 (which may be optional) of step 1700, the host computer provides the user data by executing a host application. In step 1704, the host computer initiates a transmission carrying the user data to the UE. In step 1706 (which may be optional), the base station transmits to the UE the user data which was carried in the transmission that the host computer initiated, in accordance with the teachings of the embodiments described throughout this disclosure. In step 1708 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 18 will be included in this section. In step 1800 of the method, the host computer provides user data. In an optional sub-step (not shown) the host computer provides the user data by executing a host application. In step 1802, the host computer initiates a transmission carrying the user data to the UE. The transmission may pass via the base station, in accordance with the teachings of the embodiments described throughout this disclosure. In step 1804 (which may be optional), the UE receives the user data carried in the transmission.

Figures 19, 20:
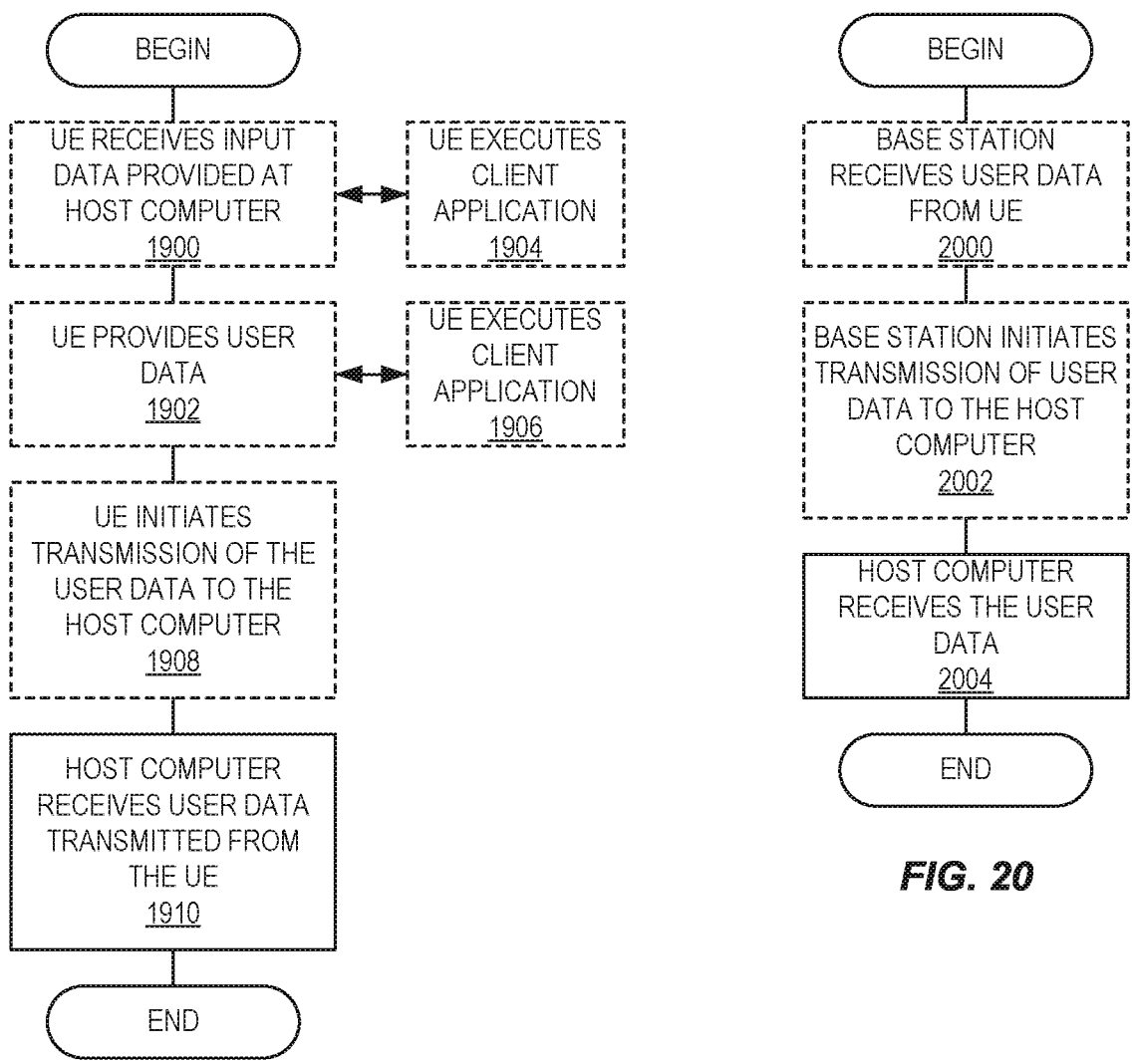
FIG. 19 is a flowchart illustrating a method implemented in a communication system in accordance with one embodiment on the present disclosure.
FIG. 20 is a flowchart illustrating a method implemented in a communication system in accordance with one embodiment of the present disclosure.

FIG. 19 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 19 will be included in this section. In step 1900 (which may be optional), the UE receives input data provided by the host computer. Additionally or alternatively, in step 1902, the UE provides user data. In sub-step 1904 (which may be optional) of step 1900, the UE provides the user data by executing a client application. In sub-step 1906 (which may be optional) of step 1902, the UE executes a client application which provides the user data in reaction to the received input data provided by the host computer. In providing the user data, the executed client application may further consider user input received from the user. Regardless of the specific manner in which the user data was provided, the UE initiates, in sub-step 1908 (which may be optional), transmission of the user data to the host computer. In step 1910 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 20 will be included in this section. In step 2000 (which may be optional), in accordance with the teachings of the embodiments described throughout this disclosure, the base station receives user data from the UE. In step 2002 (which may be optional), the base station initiates transmission of the received user data to the host computer. In step 2004 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

While not being limited thereto, some example embodiments of the present disclosure are provided below.

Embodiment 1: A method performed by a wireless device for handling an overlapping group of transmissions with differing transmission priorities, the method comprising:
  determining that at least one grant-specific uplink, UL, resource of a plurality of grant-specific UL resources overlaps with two other grant-specific UL resources of the plurality of grant-specific UL resources;
  dividing overlapping grant-specific UL resources of the plurality of grant-specific UL resources into a plurality of groups such that each group of the plurality of groups only contains one or more grant-specific UL resources that are non-overlapping;
  identifying, from the plurality of groups, a group that contains a grant-specific UL resource having a highest transmission priority; and
  performing a transmission associated with the one or more grant-specific UL resources within the identified group.

Embodiment 2: The method of embodiment 1, wherein the plurality of grant-specific UL resources comprises grant-specific UL resources within a specific duration of time.

Embodiment 3: The method of embodiment 2, wherein the specific duration of time is defined by a predefined number of orthogonal frequency-division multiplexing, OFDM, symbols or a predefined number of grant-specific UL resources.

Embodiment 4: The method of embodiment 1, wherein:
  identifying the group that contains the grant-specific UL resource having the highest transmission priority comprises:
  assigning, to each group of the plurality of groups, a priority equal to a highest transmission priority of a grant-specific UL resource within the group;
  identifying a pair of groups within the plurality of groups;
  deprioritizing the one or more grant-specific UL resources within a group having a lower priority among the pair of groups; and
  repeating the identifying and the deprioritizing for all groups within the plurality of groups; and
  performing the transmission associated with the one or more grant-specific UL resources within the identified group comprises performing the transmission associated with non-deprioritized grant-specific UL resources.

Embodiment 5: The method of embodiment 4, wherein deprioritizing the one or more grant-specific UL resources within the group having the lower priority further comprises removing the grant-specific UL resources within the group having the lower priority from further consideration of priority.

Embodiment 6: The method of any one of embodiments 4 and 5, wherein deprioritizing the one or more grant-specific UL resources comprises deprioritizing only grant-specific UL resources within a specific duration of time.

Embodiment 7: The method of embodiment 6 wherein the specific duration of time comprises a predefined number of orthogonal frequency-division multiplexing, OFDM, symbols or a predefined number of grant-specific UL resources.

Embodiment 8: A wireless device, adapted to:
  determine that at least one grant-specific uplink, UL, resource of a plurality of grant-specific UL resources overlaps with two other grant-specific UL resources of the plurality of grant-specific UL resources;

divide overlapping grant-specific UL resources of the plurality of grant-specific UL resources into a plurality of groups such that each group of the plurality of groups only contains one or more grant-specific UL resources that are non-overlapping;

identify, from the plurality of groups, a group that contains a grant-specific UL resource having a highest transmission priority; and perform a transmission associated with the one or more grant-specific UL resources within the identified group.

Embodiment 9: The wireless device of embodiment 8, further adapted to perform the method of any one of embodiment 2 to 7.

Embodiment 10: A wireless device, comprising
one or more transmitters;
one or more receivers; and
processing circuitry associated with the one or more transmitters and the one or more receivers, the processing circuitry configured to cause the wireless device to:
  determine that at least one grant-specific uplink, UL, resource of a plurality of grant-specific UL resources overlaps with two other grant-specific UL resources of the plurality of grant-specific UL resources;
  divide overlapping grant-specific UL resources of the plurality of grant-specific UL resources into a plurality of groups such that each group of the plurality of groups only contains one or more grant-specific UL resources that are non-overlapping;
  identify, from the plurality of groups, a group that contains a grant-specific UL resource having a highest transmission priority; and
  perform a transmission associated with the one or more grant-specific UL resources within the identified group.

Embodiment 11: The wireless device of embodiment 10, wherein the processing circuitry is further configured to cause the wireless device to perform the method of any one of embodiments 2 to 7.

Embodiment 12: A method performed by a wireless device for handling an overlapping group of transmissions with differing transmission priorities, the method comprising:
  determining that at least one grant-specific uplink, UL, resource of a plurality of grant-specific UL resources overlaps with two other grant-specific UL resources of the plurality of grant-specific UL resources;
  identifying a first pair of overlapping grant-specific UL resources;
  deprioritizing a grant-specific UL resource having a lower priority within the first pair;
  removing the grant-specific UL resource having the lower priority from further consideration of priority; and
  repeating the identifying and the deprioritizing until there are no more overlapping grant-specific UL resources.

Embodiment 13: The method of embodiment 12, wherein the plurality of grant-specific UL resources comprises grant-specific UL resources within a specific duration of time.

Embodiment 14: The method of embodiment 13, wherein the specific duration of time is defined by a predefined number of orthogonal frequency-division multiplexing, OFDM, symbols or a predefined number of grant-specific UL resources.

Embodiment 15: A wireless device, adapted to:
  determine that at least one grant-specific uplink, UL, resource of a plurality of grant-specific UL resources overlaps with two other grant-specific UL resources of the plurality of grant-specific UL resources;
  identify a first pair of overlapping grant-specific UL resources;
  deprioritize a grant-specific UL resource having a lower priority within the first pair;
  remove the grant-specific UL resource having the lower priority from further consideration of priority; and
  repeat the identifying and the deprioritizing until there are no more overlapping grant-specific UL resources.

Embodiment 16: The wireless device of embodiment 15, further adapted to perform the method of any one of embodiments 13 and 14.

Embodiment 17: A wireless device, comprising
one or more transmitters;
one or more receivers; and
processing circuitry associated with the one or more transmitters and the one or more receivers, the processing circuitry configured to cause the wireless device to:
  determine that at least one grant-specific uplink, UL, resource of a plurality of grant-specific UL resources overlaps with two other grant-specific UL resources of the plurality of grant-specific UL resources;
  identify a first pair of overlapping grant-specific UL resources;
  deprioritize a grant-specific UL resource having a lower priority within the first pair;
  remove the grant-specific UL resource having the lower priority from further consideration of priority; and
  repeat the identifying and the deprioritizing until there are no more overlapping grant-specific UL resources.

Embodiment 18: The wireless device of embodiment 17, wherein the processing circuitry is further configured to cause the wireless device to perform the method of any one of embodiments 13 and 14.

Embodiment 19: A method performed by a wireless device for handling an overlapping group of transmissions with differing transmission priorities, the method comprising:
  determining that at least one grant-specific uplink, UL, resource of a plurality of grant-specific UL resources overlaps with two other grant-specific UL resources of the plurality of grant-specific UL resources;
  determining that a first grant-specific UL resource of the overlapping grant-specific UL resources comprises a first Scheduling Request, SR;
  determining that the first grant-specific UL resource overlaps with another grant-specific UL resource having a lower priority than the first grant-specific UL resource; and
  upon determining that the first grant-specific UL resource overlaps with another grant-specific UL resource having a lower priority than the first grant-specific UL resource, deprioritizing all grant-specific UL resources that overlap with the first grant-specific UL resource.

Embodiment 20: The method of embodiment 19, further comprising:
  determining that a second grant-specific UL resource of the overlapping grant-specific UL resources comprises a second SR;
  determining that the second grant-specific UL resource does not overlap with another grant-specific UL resource having a lower priority than the second grant-specific UL resource; and
  upon determining that the second grant-specific UL resource does not overlap with another grant-specific UL resource having a lower priority than the second grant-specific UL resource, prioritizing overlapping grant-specific UL resources by:

identifying a first pair of overlapping grant-specific UL resources;

deprioritizing a grant-specific UL resource within the first pair having the lower priority;

removing the grant-specific UL resource within the first pair having the lower priority from further consideration of priority; and repeating the identifying and the deprioritizing until there are no more overlapping grant-specific UL resources.

Embodiment 21: The method of any one of embodiments 19 and 20, wherein the plurality of grant-specific UL resources comprises grant-specific UL resources within a specific duration of time.

Embodiment 22: The method of embodiment 21, wherein the specific duration of time is defined by a predefined number of orthogonal frequency-division multiplexing, OFDM, symbols or a predefined number of grant-specific UL resources.

Embodiment 23: A wireless device, adapted to:

determine that at least one grant-specific uplink, UL, resource of a plurality of grant-specific UL resources overlaps with two other grant-specific UL resources of the plurality of grant-specific UL resources;

determine that a first grant-specific UL resource of the overlapping grant-specific UL resources comprises a first Scheduling Request, SR;

determine that the first grant-specific UL resource overlaps with another grant-specific UL resource having a lower priority than the first grant-specific UL resource; and upon determining that the first grant-specific UL resource overlaps with another grant-specific UL resource having a lower priority than the first grant-specific UL resource, deprioritize all grant-specific UL resources that overlap with the first grant-specific UL resource.

Embodiment 24: The wireless device of embodiment 23, further adapted to perform the method of any one of embodiments 20 to 22.

Embodiment 25: A wireless device, comprising
one or more transmitters;
one or more receivers; and
processing circuitry associated with the one or more transmitters and the one or more receivers, the processing circuitry configured to cause the wireless device to:

determine that at least one grant-specific uplink, UL, resource of a plurality of grant-specific UL resources overlaps with two other grant-specific UL resources of the plurality of grant-specific UL resources;

determine that a first grant-specific UL resource of the overlapping grant-specific UL resources comprises a first Scheduling Request, SR;

determine that the first grant-specific UL resource overlaps with another grant-specific UL resource having a lower priority than the first grant-specific UL resource; and upon determining that the first grant-specific UL resource overlaps with another grant-specific UL resource having a lower priority than the first grant-specific UL resource, deprioritize all grant-specific UL resources that overlap with the first grant-specific UL resource.

Embodiment 26: The wireless device of embodiment 25, wherein the processing circuitry is further configured to cause the wireless device to perform the method of any one of embodiments 20 and 22.

Embodiment 27: A wireless device for handling an overlapping of group of transmissions with differing transmission priorities, the wireless device comprising:

processing circuitry configured to perform any of the steps of any of the above embodiments; and power supply circuitry configured to supply power to the wireless device.

Embodiment 28: A User Equipment, UE, for handling an overlapping of group of transmissions with differing transmission priorities, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of the above embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

Embodiment 29: A User Equipment, UE, configured to communicate with a base station, the UE comprising a radio interface and processing circuitry configured to perform the method of the previous 3 embodiments.

Embodiment 30: A communication system including a host computer comprising:

processing circuitry configured to provide user data; and a communication interface configured to forward user data to a cellular network for transmission to a User Equipment, UE;

wherein the UE comprises a radio interface and processing circuitry, the UE's components configured to perform any of the steps of any of the above embodiments.

Embodiment 31: The communication system of the previous embodiment, wherein the cellular network further includes a base station configured to communicate with the UE.

Embodiment 32: The communication system of the previous 2 embodiments, wherein:

the processing circuitry of the host computer is configured to execute a host application, thereby providing the user data; and the UE's processing circuitry is configured to execute a client application associated with the host application.

Embodiment 33: A method implemented in a communication system including a host computer, a base station, and a User Equipment, UE, the method comprising:

at the host computer, providing user data; and at the host computer, initiating a transmission carrying the user data to the UE via a cellular network comprising the base station, wherein the UE performs any of the steps of any of the above embodiments.

Embodiment 34: The method of the previous embodiment, further comprising at the UE, receiving the user data from the base station.

Embodiment 35: A communication system including a host computer comprising:

communication interface configured to receive user data originating from a transmission from a User Equipment, UE, to a base station;

wherein the UE comprises a radio interface and processing circuitry, the UE's processing circuitry configured to perform any of the steps of any of the above embodiments.

Embodiment 36: The communication system of the previous embodiment, further including the UE.

Embodiment 37: The communication system of the previous 2 embodiments, further including the base station, wherein the base station comprises a radio interface configured to communicate with the UE and a communication interface configured to forward to the host computer the user data carried by a transmission from the UE to the base station.

Embodiment 38: The communication system of the previous 3 embodiments, wherein:
- the processing circuitry of the host computer is configured to execute a host application; and
- the UE's processing circuitry is configured to execute a client application associated with the host application, thereby providing the user data.

Embodiment 39: The communication system of the previous 4 embodiments, wherein:
- the processing circuitry of the host computer is configured to execute a host application, thereby providing request data; and
- the UE's processing circuitry is configured to execute a client application associated with the host application, thereby providing the user data in response to the request data.

Embodiment 40: A method implemented in a communication system including a host computer, a base station, and a User Equipment, UE, the method comprising:
- at the host computer, receiving user data transmitted to the base station from the UE, wherein the UE performs any of the steps of any of the above embodiments.

Embodiment 41: The method of the previous embodiment, further comprising, at the UE, providing the user data to the base station.

Embodiment 42: The method of the previous 2 embodiments, further comprising:
- at the UE, executing a client application, thereby providing the user data to be transmitted; and
- at the host computer, executing a host application associated with the client application.

Embodiment 43: The method of the previous 3 embodiments, further comprising:
- at the UE, executing a client application; and
- at the UE, receiving input data to the client application, the input data being provided at the host computer by executing a host application associated with the client application;
- wherein the user data to be transmitted is provided by the client application in response to the input data.

Embodiment 44: A method implemented in a communication system including a host computer, a base station, and a User Equipment, UE, the method comprising:
- at the host computer, receiving, from the base station, user data originating from a transmission which the base station has received from the UE, wherein the UE performs any of the steps of any of the above embodiments.

Embodiment 45: The method of the previous embodiment, further comprising at the base station, receiving the user data from the UE.

Embodiment 46: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
PUSCH Physical Uplink Shared Channel
QOS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

What is claimed is:

1. A method performed by a wireless device for handling overlapping transmissions having different transmission priorities, the method comprising:
- determining that at least one grant-specific uplink resource of a plurality of grant-specific uplink resources overlaps with each of two other grant-specific uplink resources, wherein the one grant-specific uplink resource is a Physical Uplink Control Channel (PUCCH) resource and the two other grant-specific uplink resources are Physical Uplink Shared Channel (PUSCH) resources;

identifying a first pair of said overlapping grant-specific resources having first and second transmission priorities;

de-prioritizing one grant-specific resource of said first pair of grant-specific resources having lower transmission priority; and removing said de-prioritized grant-specific resource from further consideration of priority in a later prioritization stage.

2. A wireless device comprising a transmitter circuit, a receiver circuit, memory and a processor, wherein the processor is adapted to cause the wireless device to:

determine that at least one grant-specific uplink resource of a plurality of grant-specific uplink resources overlaps with each of two other grant-specific uplink resources, wherein the one grant-specific uplink resource is a Physical Uplink Control Channel (PUCCH) resource and the two other grant-specific uplink resources are Physical Uplink Shared Channel (PUSCH) resources;

identify a first pair of said overlapping grant-specific resources having first and second transmission priorities;

de-prioritize one grant-specific resource of said first pair of grant-specific resources having lower transmission priority; and remove said de-prioritized grant-specific resource from further consideration of priority in a later prioritization stage.

* * * * *